(12) United States Patent
Nakao et al.

(10) Patent No.: US 7,397,340 B2
(45) Date of Patent: Jul. 8, 2008

(54) LOAD SENSOR AND ITS MANUFACTURING METHOD

(75) Inventors: Keiichi Nakao, Osaka (JP); Yukio Mizukami, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 253 days.

(21) Appl. No.: 10/529,704

(22) PCT Filed: Oct. 28, 2004

(86) PCT No.: PCT/JP2004/015980

§ 371 (c)(1),
(2), (4) Date: Mar. 29, 2005

(87) PCT Pub. No.: WO2005/043102

PCT Pub. Date: May 12, 2005

(65) Prior Publication Data

US 2006/0001521 A1    Jan. 5, 2006

(30) Foreign Application Priority Data

Nov. 4, 2003    (JP)    ............... 2003-374121

(51) Int. Cl.
*G01L 1/22* (2006.01)
(52) U.S. Cl. ........................................................ 338/2
(58) Field of Classification Search ............ 338/2, 338/13, 25, 42, 47, 275, 308–309, 314; 29/595, 29/612, 621.1; 73/727
See application file for complete search history.

(56) References Cited

U.S. PATENT DOCUMENTS 5,867,886 A * 2/1999 Ratell et al. ............... 29/595
5,898,359 A * 4/1999 Ellis ............................ 338/47
6,543,102 B1 * 4/2003 Zitzmann ..................... 338/25
7,164,342 B2 * 1/2007 Nakao et al. ................. 338/47

FOREIGN PATENT DOCUMENTS

JP    54-41304    12/1979

(Continued)

OTHER PUBLICATIONS

European Search Report issued in corresponding European Patent Application No. EP 04793090.4-1236, dated Aug. 23, 2007.

*Primary Examiner*—Elvin Enad
*Assistant Examiner*—Joselito Baisa
(74) *Attorney, Agent, or Firm*—McDermott Will & Emery LLP

(57) ABSTRACT

A load sensor includes a substrate, a glass layer provided on the substrate, a wiring provided on the glass layer, an adjusting layer provided on the glass layer, and a strain-sensitive resistor element provided on the adjusting layer and connected to the wiring. A thermal expansion coefficient of the adjusting layer is closer to that of the strain-sensitive resistor element than that of the glass layer. In this load sensor, a stress remaining inside the resistor element is reduced, and the change over time of the resistance of the element is accordingly suppressed. Therefore, a single kind of the resistor element can be formed on substrates having respective thermal expansion coefficients, shapes, and thicknesses, thereby providing various load sensors having respective specifications.

14 Claims, 15 Drawing Sheets

FOREIGN PATENT DOCUMENTS

| | | |
|---|---|---|
| JP | 61-67901 | 4/1986 |
| JP | 63-298128 | 12/1988 |
| JP | 6-294693 | 10/1994 |
| JP | 9-273968 | 10/1997 |
| JP | 11-326090 | 11/1999 |

* cited by examiner

LOAD SENSOR AND ITS MANUFACTURING METHOD

TECHNICAL FIELD

The present invention relates to a load sensor for measuring a load, a dynamical strain applied to the sensor, and to a method of manufacturing the load sensor.

BACKGROUND ART

Japanese Patent Laid-Open Publication No. 63-298128 discloses a pressure sensor including an insulating layer formed on a metal substrate and a thick-film resistor formed on a surface of the insulating layer. The insulating layer glass-glazed used for this pressure sensor employs glass having a thermal expansion coefficient close to that of metallic material.

Japanese Patent Laid-Open Publication No. 61-67901 discloses that a thermal expansion coefficient of glass used for a resistor element is made equal to that of a substrate so as to cause temperature coefficient of resistance (TCR) characteristics of a glazed stainless-steel substrate to match those of a strain-sensitive resistor element formed on the substrate. The substrate, a base, has a thermal expansion coefficient of $70\times10^{-7}/°$ C., and the resistor element is made of material having a thermal expansion coefficient $7\times10^{-7}/°$ C. In this case, a commercially-available material for the element (having the thermal expansion coefficient of about $70\times10^{-7}/°$ C.) for alumina substrates can be used.

Japanese Patent Laid-Open Publication No. 6-294693 discloses that a thermal expansion coefficient of glass frit contained in a strain-sensitive resistor element is made close to that of a substrate.

Japanese Patent Laid-Open Publication No. 9-273968 discloses a dynamic-quantity sensor that prevents mutual diffusion between a strain-sensitive resistor element and glass of a base for stabilizing characteristics of the resistor element. In this sensor, two kinds of resistor elements improve matching between the resistor elements and the glass of the base. The sensor includes a first resistor element on an insulating layer on a metal substrate, and a second resistor element on the first resistor element. A resistance of the first resistor element is determined to be larger than that of the second resistor element, thereby reducing an influence to a resistance of the entire sensor even if the first resistor element is influenced by the insulating layer.

Japanese Patent No. 3010166 discloses a glass layer containing particulate alumina and particulate zinc oxide and provided between a glass layer and a strain-sensitive resistor element so as to reduce influence of mutual diffusion of the glass layer and the resistor element formed on a metal substrate.

As various types of devices using a strain-sensitive resistor element are used, a gauge factor (GF), a rate of a change in a resistance per a unit amount of strain of a resistor element, is demanded to improve. However, the resistor element has its characteristic more unstable according to an increase of the GF.

For instance, if the base substrate has a thermal expansion coefficient of $100\times10^{-7}/°$ C., a resistor element needs to be made of material having a thermal expansion coefficient of about $100\times10^{-7}/°$ C. Similarly to this, if a substrate having a thermal expansion coefficient of $140\times10^{-7}/°$ C., a resistor element needs to be made of material having that of $140\times10^{-7}/°$ C. However, commercially-available material of resistor element is for alumina substrates. That is, material having a thermal expansion coefficient other than that of the material for the alumina substrates is not available in the market, and it is difficult to newly develop such material. This is because material of resistor elements needs to optimize not only for the GF but for various parameters, such as the TCR, noise characteristic, and reliability. Thus, respective materials corresponding to various substrates having respective thermal expansion coefficients cannot substantially be developed.

The following problems still exist even if the influence by mutual diffusion between material of a strain-sensitive resistor element and material of a base substrate is reduced. Since the difference between respective thermal expansion coefficients of a metal substrate and a resistor element can not be eliminated, plural types of resistor paste corresponding to the thermal expansion coefficients of substrates need to be prepared. Further, a resistor element cannot avoid to receive a stress inside thereof due to the difference of the thermal expansion coefficients of a metal substrate and material of the resistor element.

Further, if a substrate of an actual load sensor is made of metal, the resistance of a strain-sensitive resistor element is influences by factors other than the thermal expansion coefficient. For example, in the case that a load sensor having complicated dimensions and shape according to request by a user is manufactured by die-cutting a thick metal plate with a mold, an internal stress of the metal plate causes a problem. In this way, the above-mentioned parameters, such as residual stress occurring when processing a substrate with stamping die or the like, correction of warpage occurring when die-cutting (generally, corrected by warping it inversely), and annealing, influence the thermal expansion coefficient of the actual substrate Therefore, substrates made of metallic material having a thermal expansion coefficient of $100\times10^{-7}/°$ C. and having thicknesses of 1 mm, 2 mm, and 5 mm, respectively, change in the thermal expansion coefficient and the amount of warpage. For example, the substrates formed by die-cutting metal plates having thicknesses of 1 mm and 2 mm with the same mold, respectively, the substrates exhibit different warpages immediately after the die-cutting. Accordingly, even if warpage is corrected, respective amounts of warpage of the substrates are slightly different after the substrates are fired at 850° C. A thick substrate having a thickness of 5 mm, for example, has warpage much different from those of the above this substrates after the firing since a die-cutting method applied to the thick substrate is different than the thin substrates. Such warpage and deformation of a substrate influence a resistor element like the thermal expansion coefficient, thus tending to make the resistance unstable. Further, such distortion occurs during laser processing as well as the above-mentioned die-cutting.

In the conventional load sensor, various stresses are produced in a resistor element on a substrate due to the difference of substrates (e.g. material, thickness, shape), and processing methods (e.g. residual stress in machining, annealing, die-cutting, and stamping). The resistance tends to change over time according to an increase of the GF.

SUMMERY OF THE INVENTION

A load sensor includes a substrate, a glass layer provided on the substrate, a wiring provided on the glass layer, an adjusting layer provided on the glass layer, and a strain-sensitive resistor element provided on the adjusting layer and connected to the wiring. A thermal expansion coefficient of the adjusting layer is closer to that of the strain-sensitive resistor element than that of the glass layer.

In this load sensor, a stress remaining inside the resistor element is reduced, and the change over time of the resistance of the element is accordingly suppressed. Therefore, a single kind of the resistor element can be formed on substrates having respective thermal expansion coefficients, shapes, and thicknesses, thereby providing various load sensors having respective specifications.

REFERENCE NUMERALS

1 Substrate
2 Glass Layer
3 Adjusting Layer
4 Wiring
5 Strain-Sensitive Resistor Element
6 Protective Layer
20 Internal Electrode

DETAILED DESCRIPTION OF PREFERRED EMBODIMENT

Figure 1:
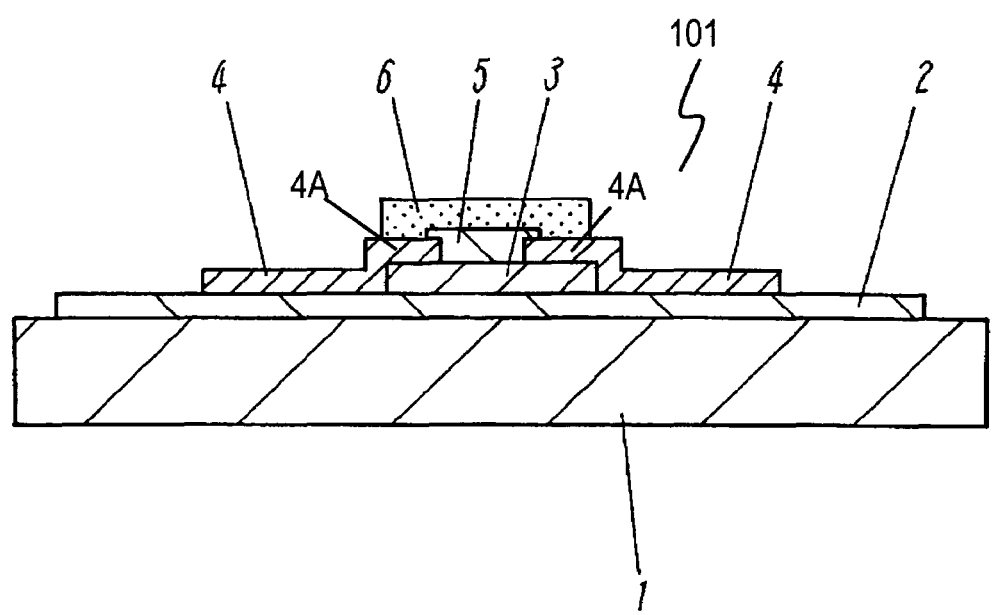
FIG. 1 is a sectional view of a load sensor according to an exemplary embodiment of the present invention.

FIG. 1 is a sectional view of load sensor 101 according to an exemplary embodiment of the present invention. Glass layer 2, an insulating layer, is formed on substrate 1. Adjusting layer 3 made of glass material is formed on a center of glass layer 2. Each of plural wirings 4 has a portion located on glass layer 2 and has another portion located on adjusting layer 3. Strain-sensitive resistor element 5 is formed between wirings 4 and on adjusting layer 3. Protective layer 6 is formed on resistor element 5 and wiring 4 to protect them.

The absolute value of the difference between respective thermal expansion coefficients of adjusting layer 3 and resistor element 5 is smaller than the absolute value of the difference between respective thermal expansion coefficients of glass layer 2 and resistor element 5. In other words, in load sensor 101 according to the embodiment, the thermal expansion coefficient of adjusting layer 3 is closer to that of strain-sensitive resistor element 5 than that of glass layer 2. According to the embodiment, the thermal expansion coefficient of adjusting layer 3 is substantially equal to that of resistor element 5. Even if the thermal expansion coefficients of resistor element 5 is much different from that of substrate 1, adjusting layer 3 provided between resistor element 5 and glass layer 2 absorbs the difference of the amounts of thermal expansion thereof due to the difference of the thermal expansion coefficients. Resistor element 5 does not contact substrate 1 or glass layer 2 both having the thermal expansion coefficients much different from that of resistor element 5.

Figure 2A:
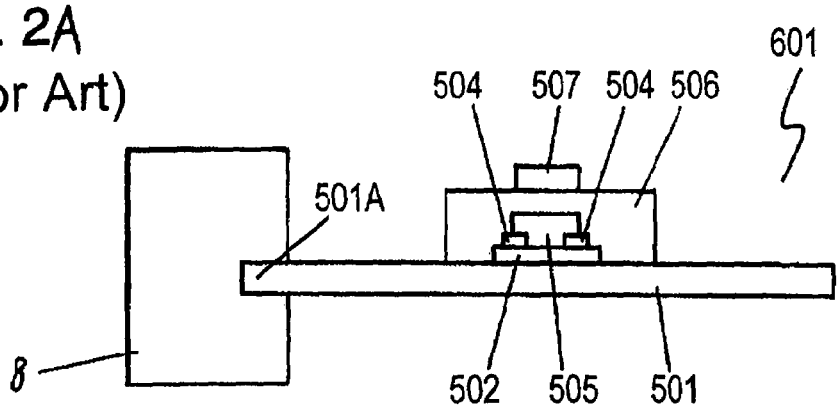
FIG. 2A is sectional views of the load sensor according to the embodiment and a conventional load sensor.
Figure 2B:
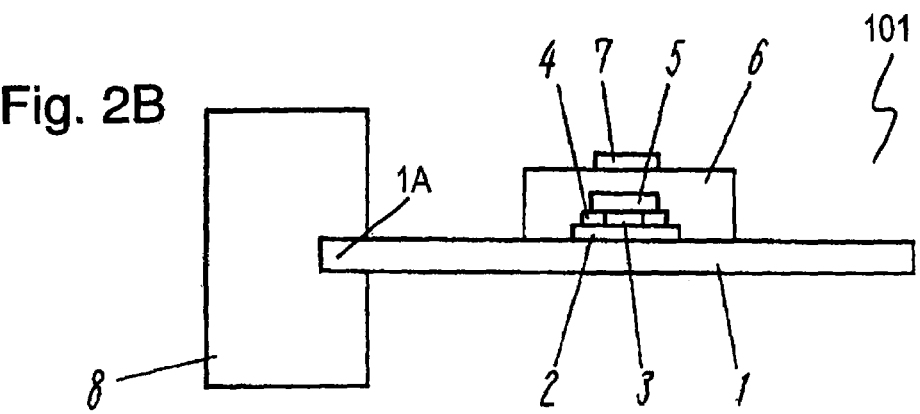
FIG. 2B is sectional view of the load sensor according to the embodiment and the conventional load sensor.
Figure 2C:
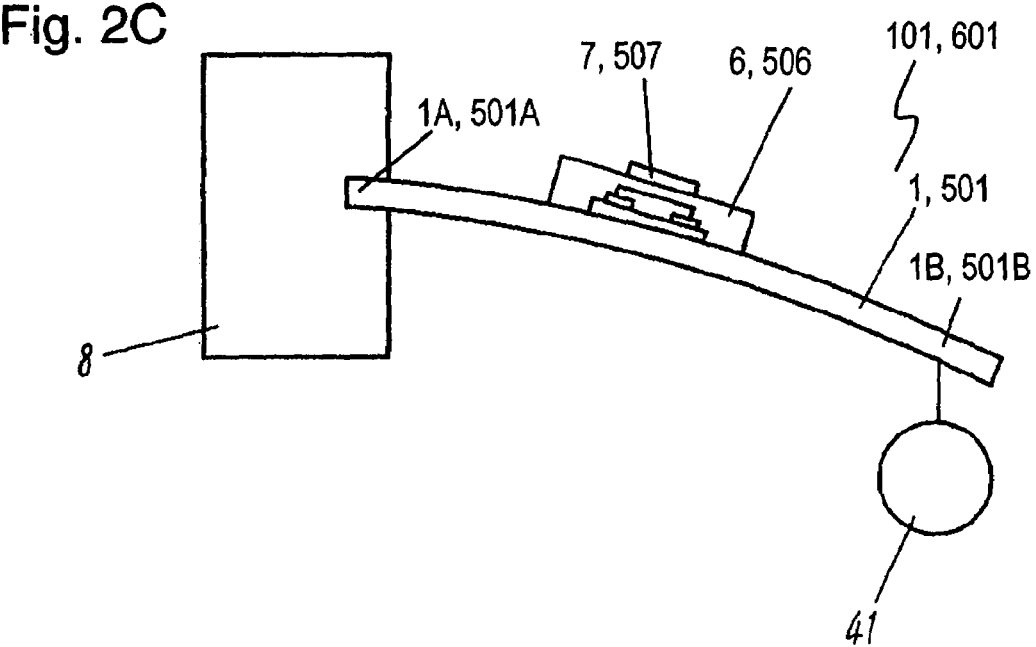
FIG. 2C is sectional views of the load sensor according to the embodiment and the conventional load sensor.

FIGS. 2A to 2C are explanatory diagrams for comparing load sensor 101 according to the embodiment with conventional load sensor 601.

FIG. 2A is a sectional view of conventional load sensor 601. Glass layer 502 is formed on substrate 501, and wiring 504 and resistor element 505 are formed on glass layer 502. Protective layer 506 is formed on wiring 504 and resistor element 505 to protect them. Foil gauge 507 is stuck on protective layer 506 with an adhesive. Vise 8 fixes one end 501A of substrate 501.

FIG. 2B illustrates load sensor 101 according to the embodiment shown in FIG. 1. Foil gauge 7 is provided on protective layer 6. One end of substrate 1 is fixed with vise 8. Load sensor 101 shown in FIG. 2B includes adjusting layer 3 formed between resistor element 5 and glass layer 2, differently from load sensor 501 shown in FIG. 2A.

FIG. 2C illustrates load sensors 101 and 601 each having a predetermined load given applied thereto with plummet 41. Substrates 1 and 501 deform due to plummet 41 dangled from other ends 1B and 501B of substrates 1 and 501, while one ends 1A and 501A are fixed with vise 8. The amount of distortion due to the deformation is measured as changes of respective resistances of resistor element 5 and foil gauge 7.

Figure 3A:
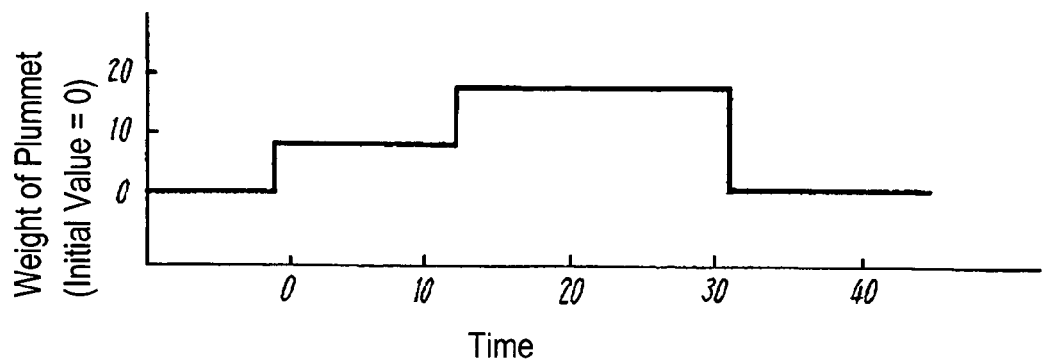
FIG. 3A illustrates a weight of a plummet applied to the load sensor according to the embodiment.
Figure 3B:
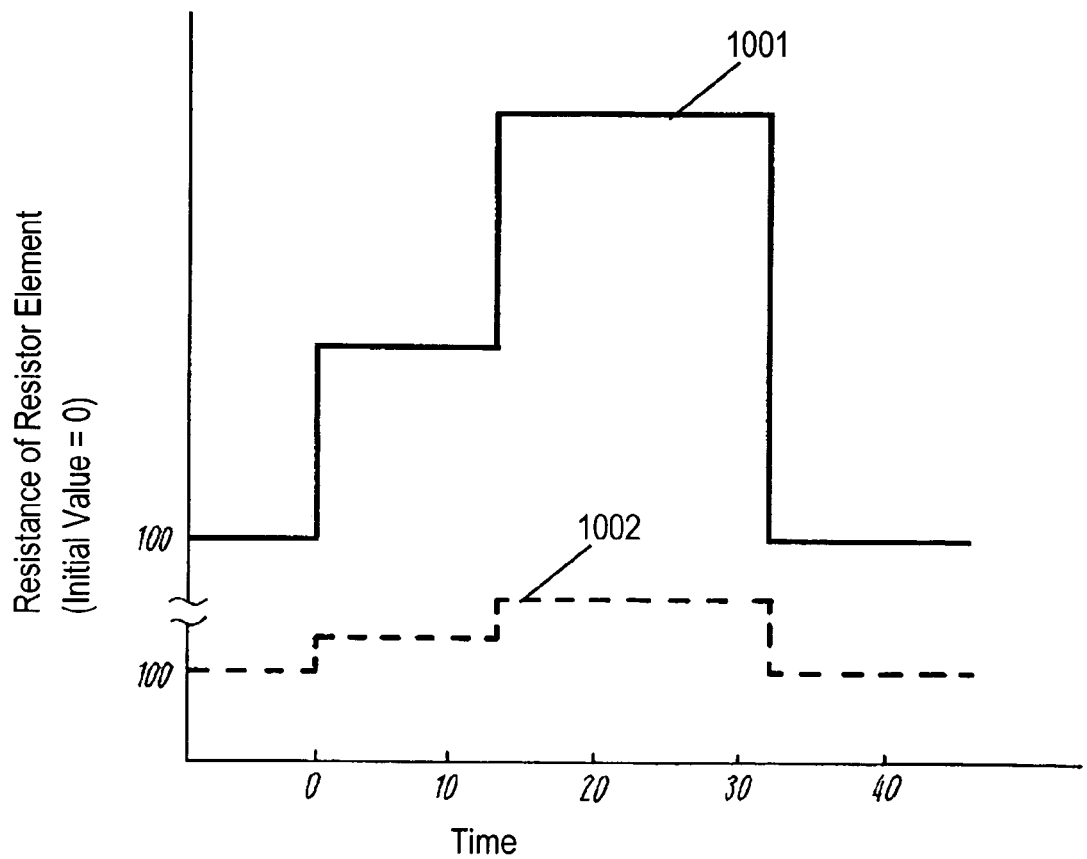
FIG. 3B illustrates a change of a resistance of the load sensor according to the embodiment.

FIGS. 3A and 3B illustrate changes of a resistance of resistor element 5 of load sensor 101 shown in FIGS. 1 and 2B according to the embodiment. In FIG. 3A, the horizontal axis represents elapsed time (in arbitrary unit), and the vertical axis represents the weight of plummet 41. When elapsed time is zero, the weight is zero, in other words, nothing is dangled from load sensor 101. The weight of plummet 41 is changed along with the elapsed time. In FIG. 3B, the horizontal axis represents the elapsed time, and the vertical axis represents the resistance of resistor element 5. The resistance shown is converted as its initial value of "100". Line 1001 shows the resistance of resistor element 5 of load sensor 101 according to the embodiment, and line 1002 shows the resistance of foil gauge 7.

Figure 4A:
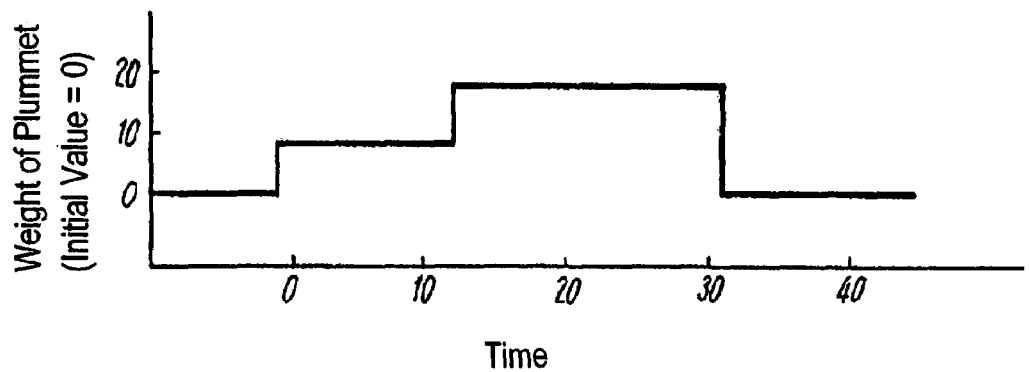
FIG. 4A illustrates a weight of a plummet applied to the conventional load sensor.
Figure 4B:
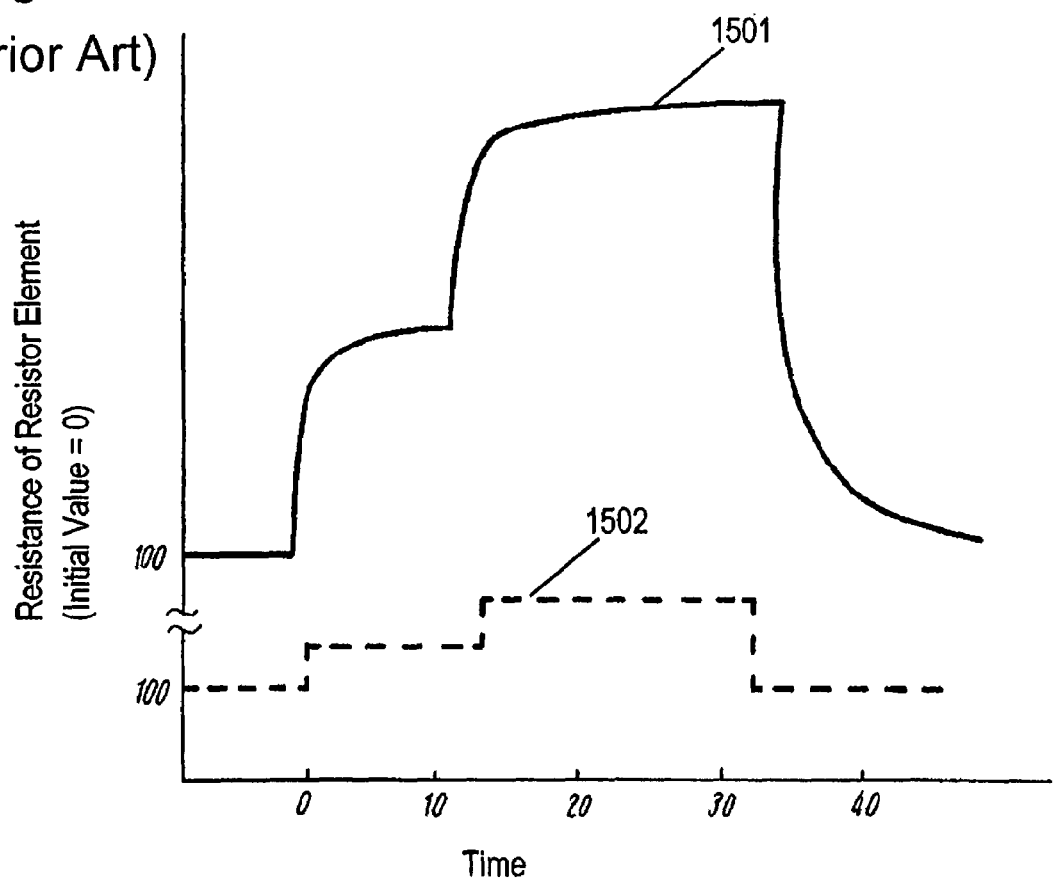
FIG. 4B illustrates a change of a resistance of the conventional load sensor.

FIGS. 4A and 4B illustrate a change of the resistance of resistor element 505 of conventional load sensor 601 shown in FIG. 2A. In FIG. 4A, the horizontal axis represents elapsed time (in arbitrary unit), and the vertical axis represents the weight of plummet 41. When elapsed time is zero, the weight is zero, in other words, nothing is dangled from load sensor 601. The weight of plummet 41 is changed along with the elapsed time. In FIG. 4B, the horizontal axis represents the elapsed time, and the vertical axis represents the resistance of resistor element 505. The resistance shown is converted as its initial value of "100." Line 1501 shows the resistance of resistor element 505 of load sensor 601, and line 1502 shows the resistance of foil gauge 507.

The resistance of load sensor 101 according to the embodiment shown by line 1001 in FIG. 3B increases and decreases proportionally to the weight of plummet 41 similarly to that of foil gauge 7 shown by line 1002, and is constant when the weight of plummet 41 is constant. The resistance of conventional load sensor 601 shown by line 1501 in FIG. 4B increases and decreases according to the weight of plummet 41. However, the resistance shown by line 1501 in FIG. 4B responds behind to the change of the weight of plummet 41, while foil gauge 7 sensitively responds to the increase and decrease of the weight of plummet 41. Further, even when the weight of plummet 41 is constant, the resistance is unstable. The larger the difference between the thermal expansion coefficients of substrate 1 and resistor element 5 is, the more prominently this phenomenon is found.

Table 1 shows the changes of the resistances of resistor elements 5 and 505 while substrates 1 and 501 have various thermal expansion coefficients. The thermal expansion coefficient of adjusting layer 3 of load sensor 101 having resistor element 5 according to the embodiment is $70 \times 10^{-7}/°$ C., which is the same as that of resistor element 5.

TABLE 1

| Thermal Expansion Coefficient ($\times 10^{-7}/°$ C.) | | | Resistance of | Resistance of |
|---|---|---|---|---|
| Substrate | Glass Layer | Resistor Element | Resistor Element 5 | Resistor Element 505 |
| 40 | 40 | 70 | Stable | Unstable |
| 60 | 60 | 70 | Stable | Stable |
| 70 | 70 | 70 | Stable | Stable |
| 80 | 80 | 70 | Stable | Stable |
| 100 | 100 | 70 | Stable | Unstable |
| 120 | 120 | 70 | Stable | Unstable |
| 140 | 140 | 70 | Stable | Unstable |
| 160 | 160 | 70 | Stable | Unstable |
| 180 | 180 | 70 | Stable | Unstable |
| 200 | 200 | 70 | Stable | Unstable |

As shown in Table 1, substrates 1 and 101 had various of thermal expansion coefficients ranging from $40 \times 10^{-7}/°$ C. to $200 \times 10^{-7}/°$ C. Glass layers 2 and 502 were made of material having the same thermal expansion coefficient as that of substrates 1 and 101, similarly to having the same thermal expansion coefficient, similarly to a sensor disclosed in Japanese Patent Laid-Open Publication No. 63-298128. Resistor elements 5 and 505 are commercially available for alumina substrates and have thermal expansion coefficients of $70 \times 10^{-7}/°$ C.

As shown in Table 1, resistor element 501 of conventional load sensor 601 has a stable resistance if the thermal expansion coefficient of substrate 501 is substantially equal to that of resistor element 505. However, the resistance is unstable if the difference between respective thermal expansion coefficients of substrate 501 and resistor element 505 is large. In load sensor 101 according to the embodiment, the resistance of resistor element 5 is stable even if the difference is large.

Then, the thermal expansion coefficient of adjusting layer 3 will be described. Table 2 shows a fluctuation of the resistance of strain-sensitive resistor element 5 of load sensor 101 including adjusting layer 3 having various thermal expansion coefficients, while the thermal expansion coefficients of substrate 1 and resistor element 5 are constant. The thermal expansion coefficient of glass layer 2 is $100 \times 10^{-7}/°$ C., which is the same as that of substrate 1.

TABLE 2

| Thermal Expansion Coefficient (×10$^{-7}$/° C.) | | | Resistance of |
|---|---|---|---|
| Substrate | Glass Layer | Resistor Element | Resistor Element 5 |
| 100 | 40 | 70 | Unstable |
| 100 | 60 | 70 | Stable |
| 100 | 40 | 70 | Stable |
| 100 | 80 | 70 | Stable |
| 100 | 100 | 70 | Unstable |
| 100 | 120 | 70 | Unstable |
| 100 | 140 | 70 | Unstable |
| 100 | 160 | 70 | Unstable |
| 100 | 180 | 70 | Unstable |
| 100 | 200 | 70 | Stable |

As shown in Table 2, in the case that the thermal expansion coefficients of substrate 1 and glass layer 2 are 100×10$^{-7}$/° C., if the thermal expansion coefficient of adjusting layer 3 is small, less than 40×10$^{-7}$/° C. and is large, more than 100×10$^{-7}$/° C., the resistance of resistor element 5 is unstable.

The thermal expansion coefficient of adjusting layer 3 matches that of resistor element 5, absorbing a stress in adjusting layer 3 from substrate 1, and preventing the stress from transferring to resistor element 5. Table 2 shows that the resistance of resistor element 5 becomes unstable if the difference between respective thermal expansion coefficients of resistor element 5 and adjusting layer 3 is more than 30×10$^{-7}$/° C. Therefore, the difference between the thermal expansion coefficients of resistor element 5 and adjusting layer 3 is less than 30×10$^{-7}$/° C., is preferably less than 20×10$^{-7}$/° C., and is more preferably less than 10×10$^{-7}$/° C.

In a process of manufacturing conventional load sensor 601, glass layer 502 is formed on substrate 501, and a paste having a predetermined shape is applied onto glass layer 502 to provide resistor element 505. The applied paste is baked in an oven to provide resistor element 505. Stress is produced in this paste while the paste is baked, producing abnormal stress in resistor element 505. A large stress produced in resistor element 505 having a small thermal expansion coefficient provided on substrate 501 having a large thermal expansion coefficient of conventional load sensor 601 will be described.

FIGS. 5A through 5D illustrate processes of producing the stress in resistor element 505 of conventional load sensor 601 excluding the adjusting layer.

Figure 5A:
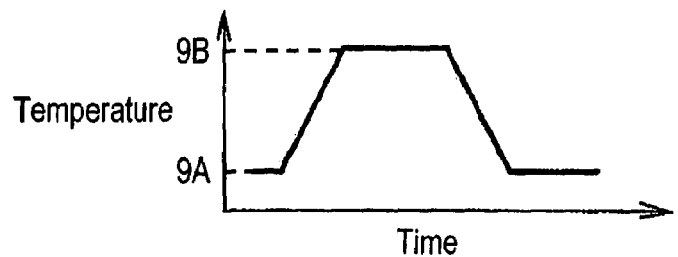
FIG. 5A is a temperature profile of the conventional load sensor.

FIG. 5A illustrates a temperature profile for firing resistor element 505 in a commercially-available mesh-belt furnace. The horizontal axis represents time, and the vertical axis represents the temperature of substrate 501. It takes approximately one hour for the temperature of substrate 501 to start at room temperature 9A after substrate 501 is input the belt furnace, to reach highest temperature 9B, and to return to room temperature 9A.

Figure 5B:
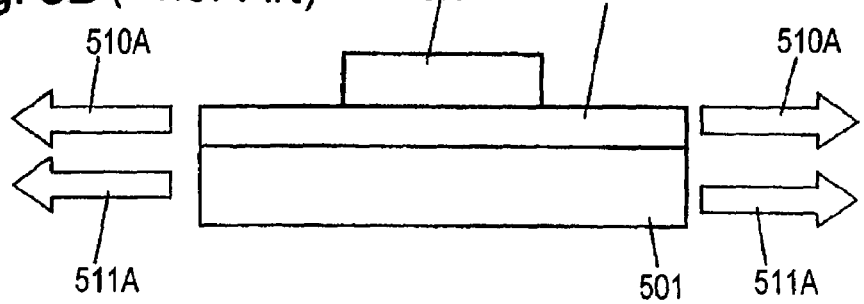
FIG. 5B is a sectional view of the conventional load sensor.

FIG. 5B is a sectional view of conventional load sensor 601 thermally expanding at highest temperature 9B. In FIG. 5B, the directions and lengths of arrows 510A and 511A denotes the directions and amounts of deformation of a sample of load sensor 601. In conventional load sensor 601, glass layer 502 is formed on substrate 501, and a paste providing resistor element 505 is applied onto glass layer 502 by printing. The applied paste is fired in a belt furnace to provide resistor element 505. In FIG. 5B, wiring 504 is not shown. When load sensor 601 is heated at highest temperature 9B in the belt furnace, substrate 501 thermally expands by a large amount, as shown by arrow 511A. Glass layer 502 having a thermal expansion coefficient close to that of substrate 501 also thermally expands in the same direction by the substantially same amount as substrate 501, as shown by arrow 511A.

Figure 5C:
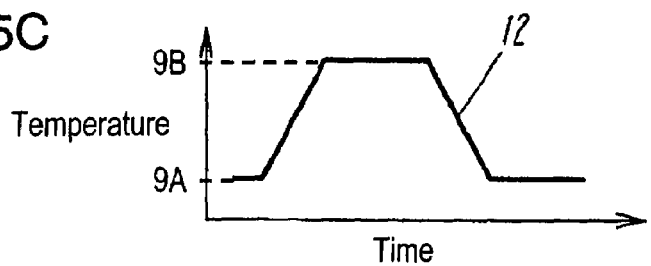
FIG. 5C is a temperature profile of the conventional load sensor.
Figure 5D:
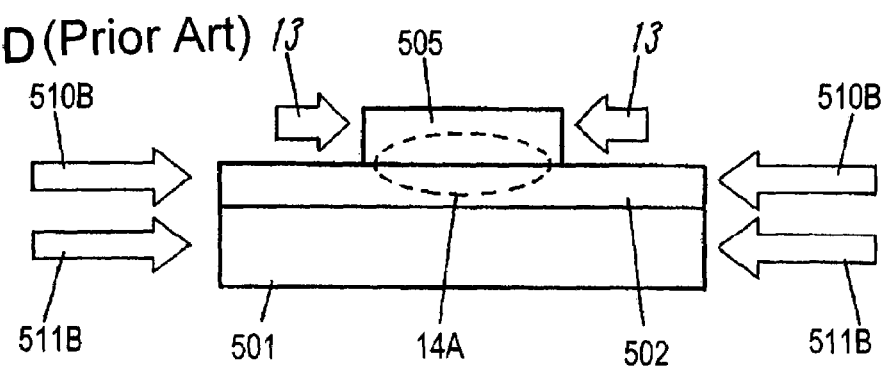
FIG. 5D is a sectional view of the conventional load sensor.

Resistor element 505 melts at highest temperature 9B. As shown in FIG. 5C, the sample enters fall-in-temperature region 12 from highest temperature 9B in the belt furnace. FIG. 5D illustrates stress applied to portions of the sample at fall-in-temperature region 12. Substrate 501 and glass layer 502 largely contract, as shown by arrows 510B and 511B, while the temperature falls in fall-in-temperature region 12. At this moment, resistor element 505 contracts by an amount smaller than the contracting amounts of substrate 501 and glass layer 502, as shown by arrow 13. Therefore, stress concentrates in region 14A near the interface between glass layer 502 and resistor element 505, causing the resistance of resistor element 505 to fluctuate.

Then, a stress produced in load sensor 101 according to the embodiment will be described.

FIGS. 6A to 6D illustrate a process of producing the stress in load sensor 101 including adjusting layer 3 according to the embodiment.

Figure 6A:
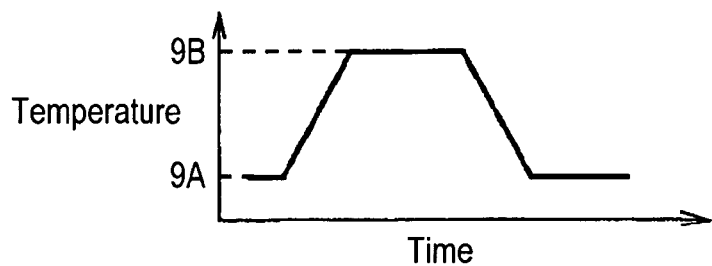
FIG. 6A is a temperature profile of the load sensor according to the embodiment.
Figure 6B:
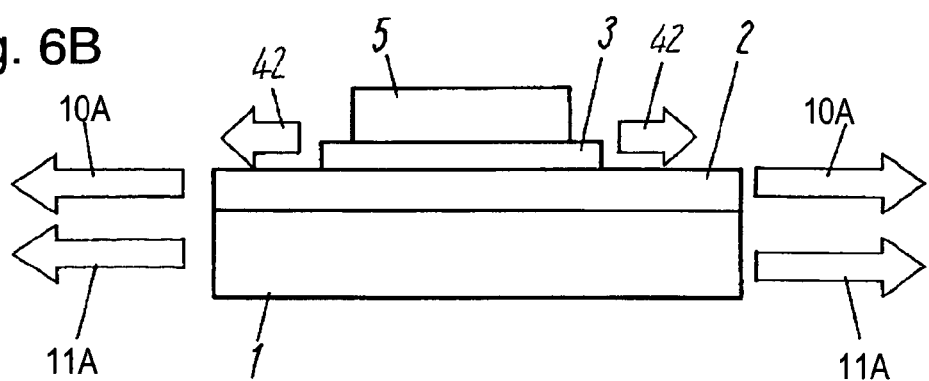
FIG. 6B is a sectional view of the load sensor according to the embodiment.

In load sensor 101, at highest temperature 9B shown in FIG. 6A, both substrate 1 and glass layer 2 thermally expands much, as shown by arrows 10A and 11A shown in FIG. 6B. Adjusting layer 3 thermally expands by an amount smaller than the expanding amounts of substrate 1 and glass layer 2, as shown by arrow 42, while resistor element 5 melts.

Figure 6C:
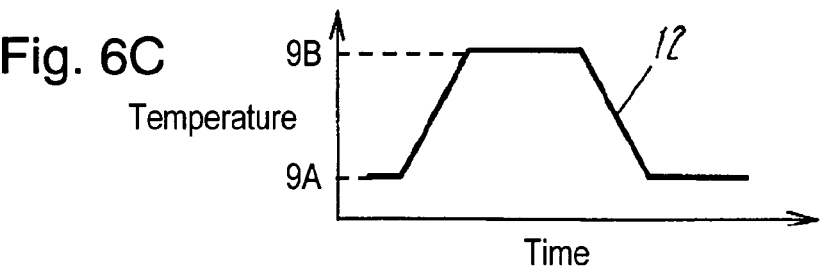
FIG. 6C is a temperature profile of the load sensor according to the embodiment.
Figure 6D:
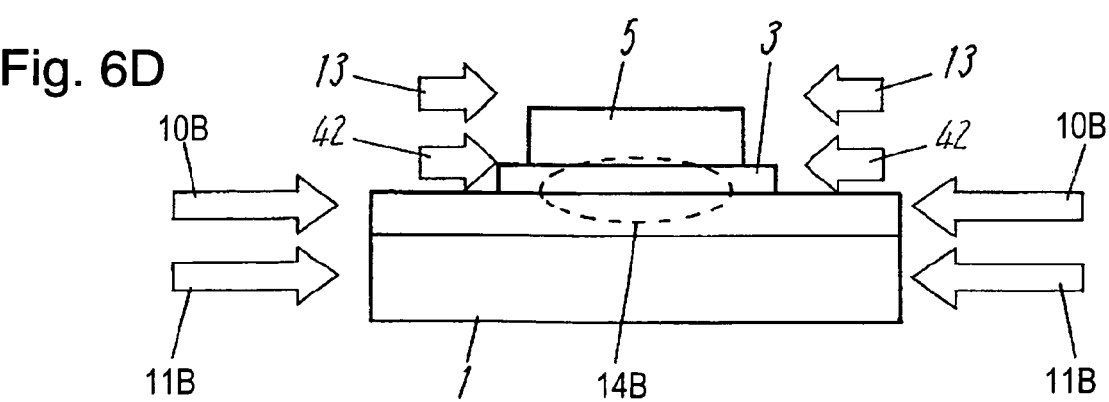
FIG. 6D is a sectional view of the load sensor according to the embodiment.

In fall-in-temperature region 12 shown in FIG. 6C, substrate 1 and glass layer 2 contract much, as shown by arrows 10B and 11B shown in FIG. 6D. Resistor element 5 and adjusting layer 3 contract little by an amount smaller than the contracting amounts of substrate 1 and glass layer 2, as shown by arrows 13 and 42. Stress due to the difference between the thermally-contracting amount of substrate 1 or glass layer 2 and the thermally-contracting amount of resistor element 5 concentrates at region 14B near the interface between glass layer 2 and adjusting layer 3. This prevents resistor element 5 from receiving the stress due to the difference of the thermally-contracting amounts from, thus stabilizing the resistance of the resistor element.

Then, a method of manufacturing load sensor 101 including substrate 1 having an arbitrary thermal expansion coefficient will be described. A user selects substrate 1 from substrates having various thermal expansion coefficients, thicknesses, and shapes according to intended use.

Figure 7:
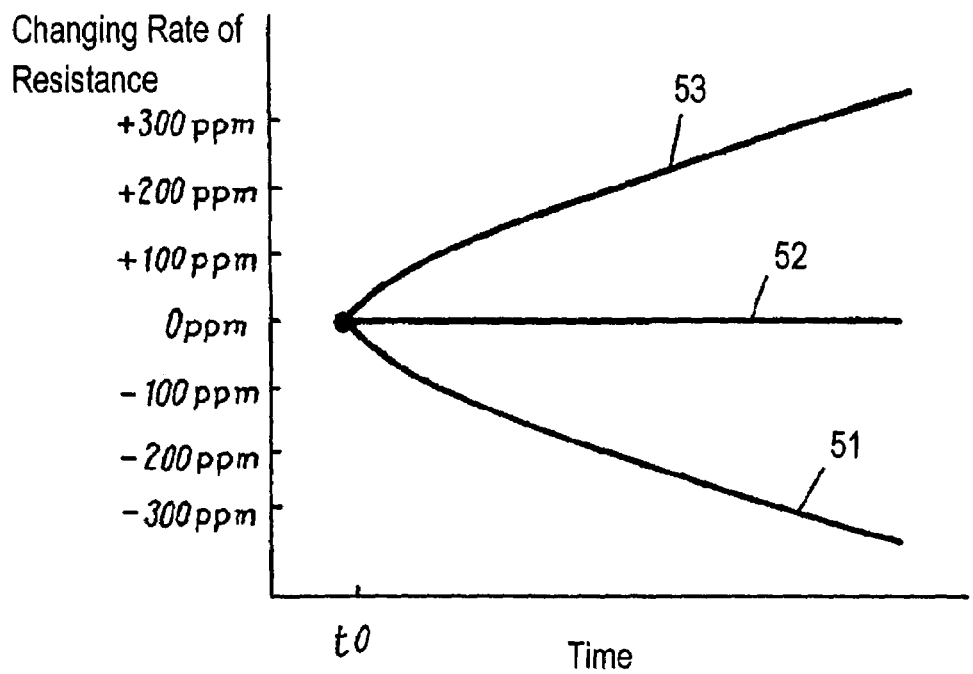
FIG. 7 illustrates a change of a resistance of the conventional load sensor.

FIG. 7 shows fluctuation of resistances of samples of strain-sensitive resistor element 505 of conventional load sensor 601 including substrate 501 having various characteristics. In FIG. 7, the horizontal axis represents elapsed time, and the vertical axis represents a change of the resistance of resistor element 505 as a changing rate as its initial resistance (time t0 on the horizontal axis) in ppm. That is, FIG. 7 shows measurement in higher resolution than FIG. 4B.

The resistance of the samples of resistor element 505 changes as the following cases: the resistance decreases along with the elapsed time as denoted by characteristic 51 shown in FIG. 7; the resistance does not change as denoted by characteristic 52; and the resistance increases along with the elapsed time as denoted by characteristic 53.

When the resistance does not fluctuate as denoted by characteristic 52, even conventional load sensor 601 operates properly. However, resistor element 505 having a resistance having characteristic 51 or characteristic 53 requires adjusting layer 3.

The resistance having characteristic 51 decreases along with the elapsed time since resistor element 5 becomes gradually but slightly shorter along with the elapsed time. Resistor element 5 is shortened by glass layer 2, being gradually shortened along with the elapsed time. For resistor element 5 having the resistance having characteristic 51, the thermal expansion coefficient of adjusting layer 3 is determined so that resistor element 5 is not shortened.

The resistance having characteristic 53 increases along with the elapsed time since resistor element 5 becomes gradually longer along with the elapsed time. Resistor element 5 becomes gradually longer by being pulled by glass layer 2. For resistor element 5 having the resistance having characteristic 53, the thermal expansion coefficient of adjusting layer 3 is determined so that resistor element 5 is not pulled.

As mentioned above, a major cause of the change of resistance of strain-sensitive resistor element 5 is a stress produced in the resistor element. The thermal expansion coefficient of adjusting layer 3 contacting resistor element 5 is determined appropriately to adjust a stress produced in resistor element 5, thus suppressing the change along with time of the resistance.

When a paste providing strain-sensitive resistor element 5 fired in the belt furnace melts to become soft at a high temperature, very little stress is produced in the paste (resistor element 5). However, as the paste cools to harden, various stresses are produced in resistor element 5. Actually, in conventional load sensor 601, the resistance of resistor element 505 is largely influenced by thermal expansion of substrate 501 and glass layer 502.

In load sensor 101 shown in FIG. 1, adjusting layer 3 is made of glass material having a thermal expansion coefficient close to that of resistor element 5. In load sensor 101, the resistance of resistor element 5 may change by (tens to hundreds of ppm/hour). Ceramic filler (ceramic powder) having a thermal expansion coefficient different from that of glass material of adjusting layer 3 may be added in the glass material so as to adjusting a total thermal expansion precisely, thereby stabilizing the resistance of resistor element 5.

Figure 8:
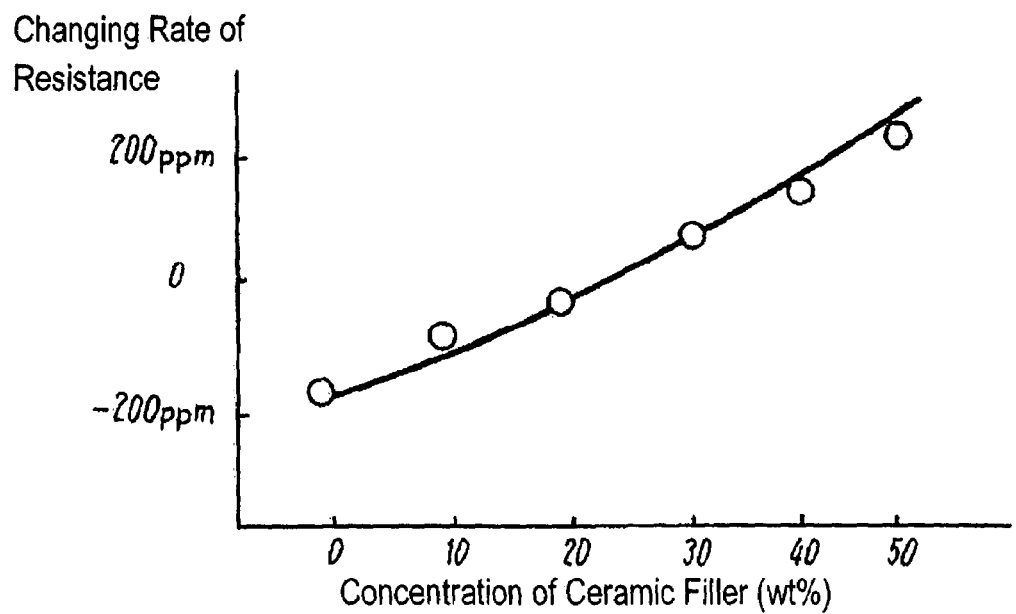
FIG. 8 illustrates a change of a resistance of the load sensor according to the embodiment.
Figure 9:
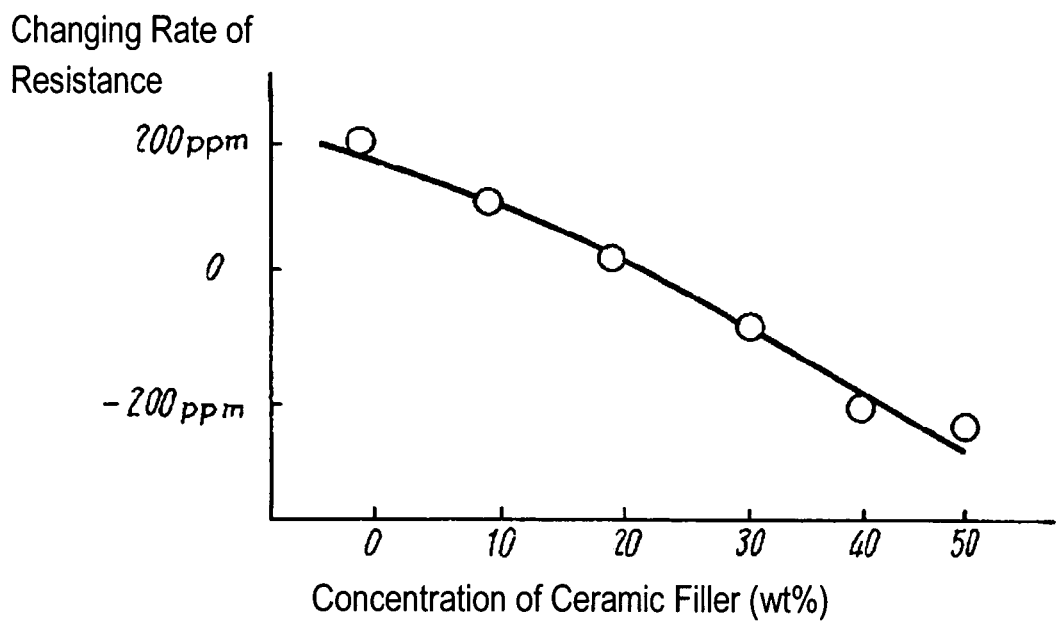
FIG. 9 illustrates a change of a resistance of another load sensor according to the embodiment.

FIGS. 8 and 9 illustrate changes of the resistance of resistor element 5 of load sensor 101 including adjusting layer 3 having the ceramic filler added therein according to the embodiment. In FIGS. 8 and 9, the horizontal axis represents a concentration (wt %) of the ceramic filler in the glass material of adjusting layer 3, and the vertical axis represents a changing rate (ppm/h) of the resistance of resistor element 5. The changing rate represented by the vertical axis corresponds to the change of the resistance per unit time, i.e., the gradients of characteristics 51 to 53 shown in FIG. 7. Making the gradients of the characteristics shown in FIG. 7 close to zero corresponds to making the changing rate represented by the vertical axis of FIGS. 8 and 9 close to zero.

An adjusting layer made of glass material which does not contain the ceramic filler may cause the resistance of resistor element 5 to decrease along with the elapsed time, as denoted by characteristic 51 shown in FIG. 7. A sample including this adjusting layer corresponds to a case that the concentration of the ceramic filler in the glass material of the adjusting layer is 0 wt %, as shown in FIG. 8, thus causing the changing rate of the resistance shown in FIG. 8 to be negative. In this sample, it is considered that a stress decreasing the resistance along with the elapsed time is produced in resistor element 5. In order to prevent such stress, ceramic filler having a predetermined thermal expansion coefficient is added to the adjusting layer. The amount of the added ceramic filler is adjusted to decrease the stress decreasing the resistance of the resistor element, thus preventing the change of the resistance, as shown in FIG. 8.

Further, an adjusting layer made of glass material which does not contain ceramic filler may cause the resistance of resistor element 5 to increase along with the elapsed time, as denoted by characteristic 53 shown in FIG. 7. A sample having this adjusting layer corresponds to a case that the concentration of the ceramic filler in the glass material of the adjusting layer is 0 wt %, as shown in FIG. 9, thus causing the changing rate of the resistance is positive, as shown in FIG. 9. In this sample, a stress increasing the resistance along with the elapsed time is produced in resistor element 5 In order to prevent the stress, ceramic filler having a predetermined thermal expansion coefficient is added to the adjusting layer. The amount of the added ceramic filler is adjusted to decrease the stress in the resistor element for increasing the resistance of the resistor element, thus reducing the change of the resistance, as shown in FIG. 9.

Composite glass including the ceramic filler added to the glass material of adjusting layer 3 may include less than 50 wt % of the filler, and preferably less than 40 wt % of the filler. The ceramic filler included at a concentration exceeding 50 wt % reduces the density of the composite glass, hence decreasing physical strength of the glass and accordingly not providing the load sensor with insufficient strength required.

For prepare for the above-mentioned cases, several kinds of glass materials having thermal expansion coefficients different from each other and ceramic fillers having thermal expansion coefficients different from each other may be preferably prepared. Even if the resistance of resistor layer 5 changes as characteristics 51 and 53 shown in FIG. 7, this preparation suppresses the change, as shown in FIGS. 8 and 9, when a load sensor including substrate 1 specified by a user is manufactured. As above, several kinds of materials of adjusting layer 3 having different thermal expansion coefficients are prepared for manufacturing a load sensor shown in FIG. 1. As shown in FIGS. 8 and 9, the changing rate of the resistance due to the amount of the added ceramic filler is observed, and composition of the glass material and the ceramic filler for minimizing the changing rate is determined. Thermal expansion coefficients of resistor element 5, glass layer 2, and adjusting layer 3 may be measured previously as basic data, thereby often optimizing the composition of the glass material and the ceramic filler by simulation without actual manufacturing. However, lot-to-lot variation and variation in firing conditions of resistor element 5, and influences by mutual diffusion of materials may prevent a composition from being optimized by simulation. In such case, changing actual materials shown in FIG. 8 is the most effective and practical method for determining optimum composition.

According to the embodiment, the ceramic filler added in the glass material may be alumina, zirconia, magnesia, or calcia, suppressing the fluctuation of the resistance of resistor layer 5 to less than a few of ppm.

According to the embodiment, the composition of adjusting layer 3 is adjusted precisely with only the glass material. According to the embodiment, adjusting layer 3 includes glass and ceramic, however, may be preferably include only glass.

Figure 10:
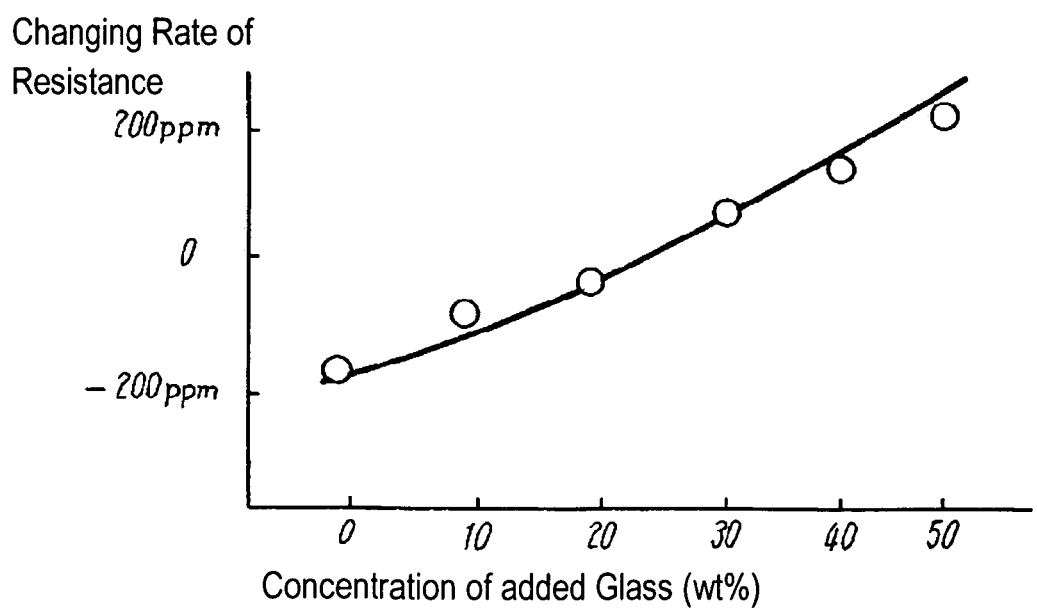
FIG. 10 illustrates a change of a resistance of a further load sensor according to the embodiment.
Figure 11:
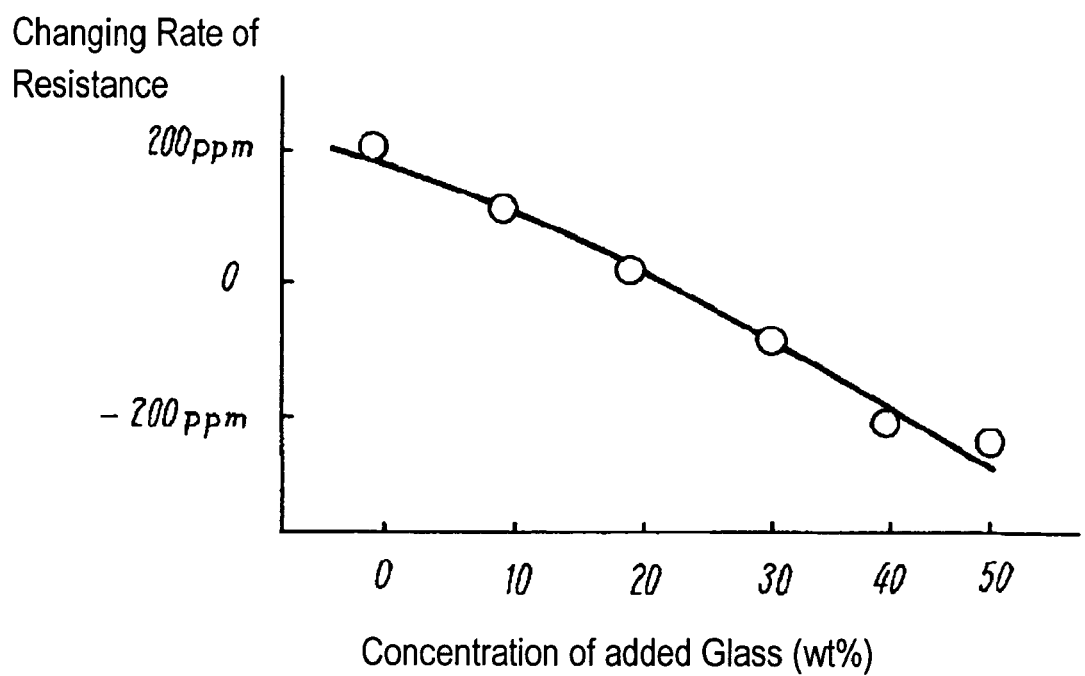
FIG. 11 illustrates a change of a resistance of a still further load sensor according to the embodiment.

Optimizing adjusting layer 3 provided by mixing plural kinds of glasses having different thermal expansion coefficients will be described below with reference to drawings. FIGS. 10 and 11 illustrate changing rates of the resistance of strain-sensitive resistor layer 5 due to adjusting layer 3 including plural kinds of glasses. The horizontal axis represents the concentration of additive glass in the composite glass, material of adjusting layer 3. The vertical axis represents the change rate of the resistance of resistor element 5. In FIG. 10, the changing rate of the resistance increases according to increase of the additive glass; while, in FIG. 11, the changing rate decreases according to increase of the additive glass.

Adjusting layer 3 is formed, as shown in FIGS. 10 and 11, while adjusting layer 3 includes $SiO_2.ZnO.PbO$-based crystalline glass having a thermal expansion coefficient ranging from about $60\times10^{-7}/°$ C. to about $80\times10^{-7}/°$ C. as main component. Adjusting layer 3 may further include, as the additive glass, $SiO_2.B_2O_3.RO$-based noncrystalline glass having a thermal expansion coefficient of about $100\times10^{-7}/°$ C. which is larger than the thermal expansion coefficient of the main component. Adjusting layer 3 may further include, as the additive glass, $SiO_2.ZnO.RO$-based crystallized glass having a thermal expansion coefficient of about $50\times10^{-7}/°$ C. smaller than that of the main component. This operation can suppress the changing rate of the resistance to less than a few of ppm.

Load sensors often have specific shapes so as to be built in devices of the usuer. Therefore, different residual stresses are produced in substrates 1 depending on a processing method even if the substrates are made of the same metallic material and have the same thicknesses. Inversely-warping is often performed to correct deformation at the processing of the substrate. Simulation can often eliminate precise adjustment of the component of adjusting layer 3 by experiment. However, if the resistance of resistor element 5 is susceptible to being influenced by residual stress, the component of adjusting layer 3 may be adjusted precisely according to the embodiment, which is effective.

The difference of thermal contraction at the interface between glass layer 2 and adjusting layer 3 may decrease bonding strength at the interface, possibly causing the layers to remove from each other. In such case, different glass materials mixed as mentioned above increase the bonding strength of adjusting layer 3 to glass layer 2 a base of adjusting layer 3.

Then, the glass material of adjusting layer 3 will be described below. Material for alumina substrate is available for material of strain-sensitive resistor element 5. Glass material of adjusting layer 3 corresponding to such resistor element 5 may preferably include $SiO_2$, $ZnO$, or alkaline earth oxide as main component. Adjusting layer 3 may include material having a low softening temperature, such as lead oxide and bismuth oxide. However, if resistor element 5 includes lead oxide or bismuth oxide, mutual diffusion of resistor element 5 and adjusting layer 5 may change the resistance and a temperature coefficient of resistance (TCR) of resistor element 5.

However, even in this case, ceramic may be added as filler to reduce such influence since the ceramic itself has a high melting temperature and cause very little mutual diffusion with resistor element 5 at a firing temperature of about 850° C. Alternatively, the composition of the glass material of adjusting layer 3 may be adjusted to adjust the TCR and the absolute value of the resistance of resistor element 5.

Crystalline glass material may be used as the glass material of adjusting layer 3. The crystalline glass material is fired for crystallization before resistor element 5 is formed. Resistor element 5 is printed on adjusting layer 3 made of the crystallized glass material. The crystallized glass material of adjusting layer 3 does not melt again even if fired at about 850° C., thus preventing the mutual diffusion with resistor element 5. In the case that load sensor 101 is for automobile use, such as a smart air bag system in an automobile, the sensor may break due to impact of crash, while the sensor does not operate at such a minor accident that an air bag does not open. Even if substrate 1 itself has a sufficient bearing force, a prtion made of glass material (e.g. adjusting layer 39) composing the sensor may break. According to experiments, adjusting layer 3 made of the crystallized glass material is more resistant to breakage due to mechanical shock and is more reliable than adjusting layer 3 made of non-crystalline glass material.

Substrate 1 specified by a user has its own thermal expansion coefficient based on material (e.g. metal or ceramic), thickness, shape, and various physical properties, such as residual stress depending on a method of processing the substrate (e.g. heat treatment of the substrate and deformation of the substrate due to residual stress). However, according to the embodiment, as aforementioned, the load sensor may be manufactured with limited kinds of strain-sensitive resistor elements 5 for substrate 1 specified by the user, hence providing multi-product production and cost reduction of load sensors. In the future, material of strain-sensitive resistor element 5 having a large gauge factor (GF) and not including ruthenium oxide may be developed, and has a thermal expansion coefficient much different from that of general glass material of resistor element 5 including ruthenium oxide. Even in this case, adjusting layer 3 provides load sensor 101 including substrate 1 made of various materials (alumina or metal).

The area of adjusting layer 3 is preferably larger than the area of resistor element 5. The area of adjusting layer 3 larger than that of resistor element 5 enables adjusting layer 3 to be located on the entire lower surface of resistor element 5. As shown in FIG. 1, portion 4A of wiring 4 is preferably formed on adjusting layer 3. Resistor element 5 contacts portion 4A of wiring 4 on adjusting layer 3, hence allowing adjusting layer 3 to be formed on the entire lower surface of resistor element 5. Further, plural resistor elements 5 may be preferably formed on single adjusting layer 3. This arrangement can unify respective characteristics of resistor elements 5, improving a yield rate of load sensors. The area of adjusting layer 3 is preferably smaller than the area of glass layer 2. If the area of adjusting layer 3 is substantially equal to or larger than that of glass layer 2, the difference between thermal expansion coefficients between adjusting layer 3 and glass layer 2 may cause layer 3 to remove from layer 2 at the interface between them, thus reducing strength.

Adjusting layer 3 preferably has a thick ness ranging from 1 μm to 500 μm. If the thickness of adjusting layer 3 is less than 1 μm, pinholes may be produced in adjusting layer 3, and adjusting layer 3 may not sufficiently absorb stress. If the thickness is greater than 500 μm, adjusting layer may be too rigid to prevent distortion of substrate 1 from being properly transmitted to resistor element 5.

When adjusting layer 3 is formed by printing and firing a glass paste, adjusting layer 3 and glass layer 2 may be fired simultaneously together, thereby reducing firing cost. Wiring 4 and adjusting layer 3 may be fired simultaneously together, thereby reducing firing cost. However, simultaneous firing of adjusting layer 3 and resistor element 5 may adversely affect characteristics of resistor element 5. In such case, the composition of material for adjusting layer 3 may be required to optimize, as described in FIGS. 8 to 11.

Load sensor 101 may include strain-sensitive resistor element 5 made of material used for a commercially-available alumina substrate and substrate 1 made of metal having a thermal expansion coefficient larger than that of the alumina substrate. As the material of resistor element 5 used for the alumina substrate, several kinds of materials of firing-type having firing temperature of 850° C. and including ruthenium oxide are available in the market. Further, glass materials and glass pastes having thermal expansion coefficients substantially equal to that of the alumina substrate for crossover and multilayer insulation in hybrid ICs are available in the market. Adjusting layer 3 having a thermal expansion coefficient precisely adjusted by adding ceramic powder to glass material as main component can stabilize the resistance of strain-sensitive resistor element 5. The glass material may preferably be crystalline material including glass component, such as $SiO_2$, ZnO, or RO (where R is alkaline-earth metal, such as Mg, Ca, Sr, or Ba.).

An average particle diameter of glass powder in glass paste for this glass material is less than 5 µm (or a center particle diameter thereof is less than 10 µm), and is preferably less than 3 µm. Such fine-grained glass powder makes the thickness of adjusting layer 3 uniform and reduces its surface roughness, hence facilitating printing of paste for the resistor element on adjusting layer 3.

Protective layer 6 preferably covers at least the entire surface of resistor element 5. Protective layer 6 may cover the entire surface of resistor element 5, portion 4A of wiring 4 connected to resistor element 5, and adjusting layer 3, and suppresses influence by outside air to resistor element 5 and the resistance, thus improving the reliability of load sensor 101.

The difference between thermal expansion coefficients of substrate 1 and resistor element 5 is not preferably less than $20 \times 10^{-7}/°$ C., and is preferably less than $300 \times 10^{-7}/°$ C. If the difference is less than $20 \times 10^{-7}/°$ C., the difference may be suppressed by adjusting firing conditions, hence make adjusting layer 3 unnecessary.

The difference between thermal expansion coefficients of substrate 1 and glass layer 2 is preferably less than $20 \times 10^{-7}/°$ C. If the difference is not less than $20 \times 10^{-7}/°$ C., the difference may produce a stress in glass layer 2, hence removing glass layer 2 from substrate 1.

The difference between thermal expansion coefficients of resistor element 5 and adjusting layer 3 is preferably not greater than $20 \times 10^{-7}/°$ C. If the difference between the thermal expansion coefficients of substrate 1 and resistor element 5 is greater than $20 \times 10^{-7}/°$ C., adjusting layer 3 may not reduce the difference within a predetermined range.

The thickness of adjusting layer 3 is preferably not less than 1 µm and is less than 500 µm. If the thickness is less than 1 µm, pinholes may be produced in adjusting layer 3 and may allow resistor element 5 to contact glass layer 2, thus making adjusting layer 3 ineffective. If the thickness of adjusting layer 3 is not less than 500 µm, rigidity of adjusting layer 3 itself may influence substrate 1, and influence stability of output of the load sensor.

The size of adjusting layer 3 is preferably not less than 0.1 mm×0.1 mm (0.01 mm²), is less than 50 mm×50 mm (2,500 mm²), and is larger than the area of resistor element 5. If the size of adjusting layer 3 is less than 0.1 mm×0.1 mm, adjusting layer 3 may be hardly formed by general thick-film technology. If the size is not less than 50 mm×50 mm, large stress may be produced in adjusting layer 3, removing glass layer 2 from adjusting layer 3 at their interface. The area of adjusting layer 3 larger than that of resistor element 5 allows adjusting layer 3 to be formed on the entire lower surface of resistor element 5, thus preventing resistor element 5 from contacting glass layer 2.

As shown in FIG. 1, at least a portion 4A of wiring 4 is formed on adjusting layer 3 as well as resistor element 5, and wiring 4 can be connected to resistor element 5 on adjusting layer 3, thus allowing paste of material of resistor element 5 to be stably printed. In the case that a bridge circuit including plural resistor elements 5, characteristics of resistor elements can be uniform, hence stabilizing output characteristics of load sensor 101.

The thickness of resistor element 5 is preferably not less than 1 µm and is less than 500 µm. If the thickness is less than 1 µm, the difference between the thermal expansion coefficients of substrate 1 and resistor element 5 prevents stress in resistor element 5, and may produce pinholes in resistor element 5, thus making adjusting layer 3 ineffective. If the thickness of resistor element 5 is greater than 500 µm, a stress produced during sintering of resistor element 5 becomes too large to be absorbed by adjusting layer 3.

The area of resistor element 5 is preferably not less than 0.1 mm×0.1 mm, is less than 50 mm×50 mm, and is smaller than that of adjusting layer 3. If the area of the resistor element 5 is less than 0.1 mm×0.1 mm, resistor element 5 may be hardly formed by technology. If the area of resistor element 5 is larger than 50 mm×50 mm, a stress produced during sintering of resistor element 5 may not be absorbed by adjusting layer 3.

Material of substrate 1 is preferably metal having a thermal expansion coefficient which is not less than $80 \times 10^{-7}/°$ C. and is less than $200 \times 10^{-7}/°$ C. Substrate 1 made of metal having a thermal expansion coefficient less than $80 \times 10^{-7}/°$ C. may not require adjusting layer 3 since the resistance of resistor element 5 may be stabilized by optimizing firing conditions. If the thermal expansion coefficient of substrate 1 is not less than $200 \times 10^{-7}/°$ C., adjusting layer 3 may not absorb the difference between the thermal expansion coefficients of resistor element 5 and substrate 1.

Substrate 1 may be formed by die-cutting a metal plate with a mold. This process provides substrate 1 inexpensively than electric discharging processing and laser processing. A metal plate processed with a mold has a residual stress therein. Such substrate 1 may slightly deform or be warped due to heat treatment. However, adjusting layer 3 according to the embodiment prevents the residual stress resistant from transferring to resistor element 5.

Material of resistor element 5 preferably has a gauge factor (GF) which is not less than 10 and is less than 1,000. Resistor element 5 made of material having a GF less than 10 may not require adjusting layer 3. Resistor element 5 having a GF larger than 1,000 may have the resistance hardly stabilized even if adjusting layer 3 is optimized.

Resistor element 5 is preferably fired at a temperature not lower than 400° C. and lower than 1,000° C. after paste of material of the resistor element is printed on adjusting layer 3. Resistor element 5 formed by firing the paste at a temperature lower than 400° C. may have a small adhesivity between adjusting layer 3 and resistor element 5 due to inadequate sintering, thus causing exfoliation at their interface. If a temperature for firing the paste exceeds 1,000° C., materials of resistor element 5 and adjusting layer 3 may diffuse too much, thereby making the resistance of resistor element 5 unstable.

Adjusting layer 3 is made preferably of glass or composite glass including glass and ceramic filler. Adjusting layer 3 made of the composite glass, upon changing the kinds of glass and filler, may provide load sensors 101 including substrate 1 and resistor element 5 having various thermal expansion coefficients.

The particle diameter of the ceramic filler is preferably not smaller than 0.01 µm and is smaller than 10 µm. If the diameter is smaller than 0.01 µm, the filler may be hardly dispersed, thereby causing large variation of characteristics of the composite glass including the ceramic filler. If the diameter is not smaller than 10 µm, adjusting layer 3 made of the composite glass may have a large surface roughness, thereby causing a large variation of the resistance of resistor element 5 formed on adjusting layer 3.

The ceramic filler is preferably made of one or more of alumina, zirconia, magnesia, titania, barium titanate, and calcia. Such inexpensive materials enables cost reduction in producing load sensor 101 as well as suppressing diffusion of resistor element 5 and the ceramic filler.

FIGS. 12A to 12D are sectional views of lord sensor 101 for illustrating a method of manufacturing the sensor according to the embodiment.

Figure 12A:
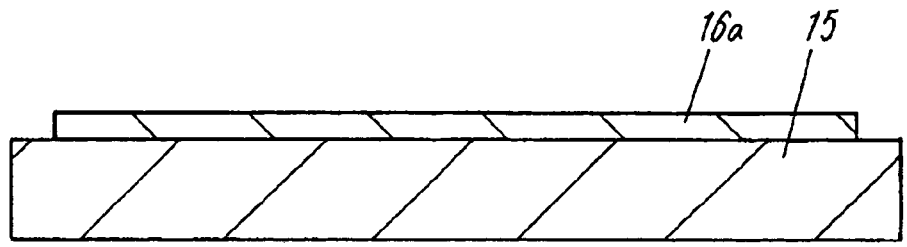
FIG. 12A is a sectional view of the load sensor for illustrating a method of manufacturing the sensor according to the embodiment.

As shown in FIG. 12A, glass paste is printed on substrate 15 and fired, providing glass layer 16a. The thickness of glass layer 16a is preferably not less than 10 μm and is not larger than 200 μm. The thickness is less than 10 μm may produce pinholes in glass layer 16a. The thickness exceeding 200 μm increases cost of glass layer 16a.

Figure 12B:
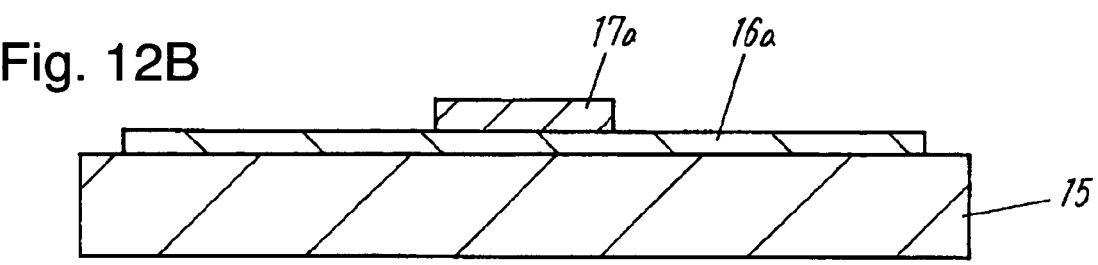
FIG. 12B is a sectional view of the load sensor for illustrating the method of manufacturing the sensor according to the embodiment.

Next, as shown in FIG. 12B, adjusting layer 17a is formed on glass layer 16a. Adjusting layer 17a is preferably larger than strain-sensitive resistor element 19a to be formed on adjusting layer 17a. Adjusting layer 17a may be formed by printing and firing paste of material of the layer.

Figure 12C:
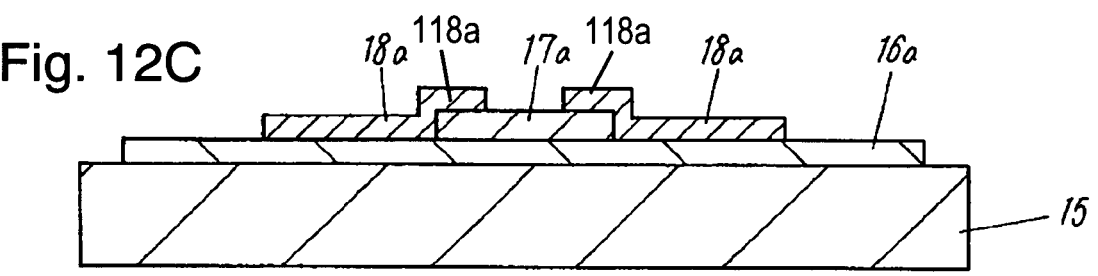
FIG. 12C is a sectional view of the load sensor for illustrating the method of manufacturing the sensor according to the embodiment.

Next, as shown in FIG. 12C, plural wirings 18a are formed. At least respective one ends 118a of the wirings are positioned on adjusting layer 17a. Wirings 18a may be formed by printing and firing paste of material of the wirings.

Figure 12D:
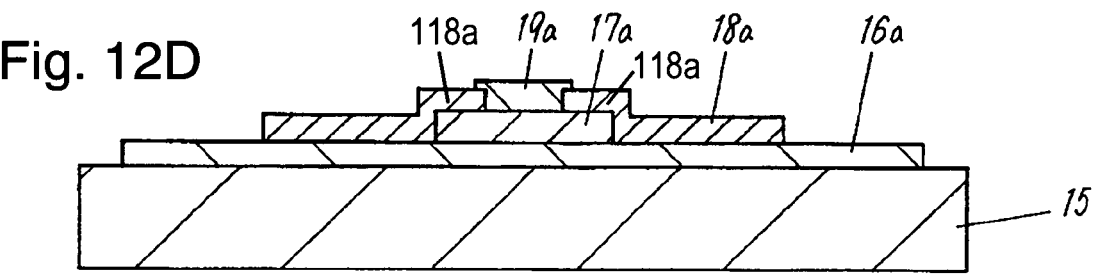
FIG. 12D is a sectional view of the load sensor for illustrating the method of manufacturing the sensor according to the embodiment.
Figure 12E:
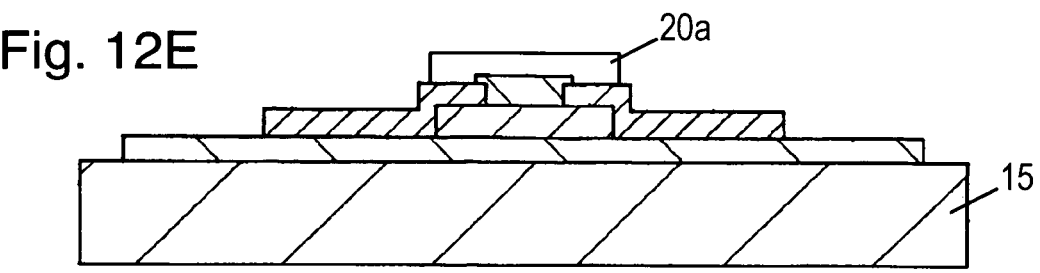
FIG. 12E is a sectional view of the load sensor for illustrating the method of manufacturing the sensor according to the embodiment.

Next, as shown in FIG. 12D, strain-sensitive resistor element 19a is formed between plural wirings 18a. Adjusting layer 17a is previously formed under resistor element 19a. Resistor element 19a can be formed by printing and firing paste of material of the element. Then, as shown in FIG. 12E, protective layer 20a covering at least the surface of resistor element 19a is formed.

The above-mentioned method provides adjusting layer 17a directly beneath resistor element 19a by an inexpensive method, such as printing, thus allowing load sensors hardly influenced by the thermal expansion coefficient of substrate 15 to be manufactured inexpensively. In FIG. 12A, glass layer 16a may have a multi-layered structure, thereby being hardly influenced by pinholes produced in the layer. Glass layer 16a and adjusting layer 17a can be formed simultaneously together by firing, thus reducing production cost. Glass layer 16a and adjusting layer 17a may have thermal expansion coefficients different from each other, the difference is negligible since adjusting layer 17a is formed on just a small area.

Glass layer 16a, adjusting layer 17a, and wirings 18a can be fired simultaneously, hence further reducing cost. Metal generally has a contraction-starting temperature lower than that of glass. Paste for forming wiring 18a may previously include contraction depressant, thereby preventing the wiring from fractures and crack due to the difference of firing contraction during the simultaneous firing. The contraction depressant may employ inorganic material, such as glass powder or ceramic powder for glass layer 16a or adjusting layer 17a. The amount of the contraction depressant to be added ranges preferably from 1 wt % to 20 wt %. The amount of the contraction depressant less than 1 wt % may not suppress contraction effectively. The amount exceeding 20 wt % increases the resistance of the wiring, hence possibly influencing characteristics of resistor element 19a.

FIGS. 13A to 13E are sectional views of another load senor for illustrating a method of manufacturing the sensor according to the embodiment.

Figure 13A:
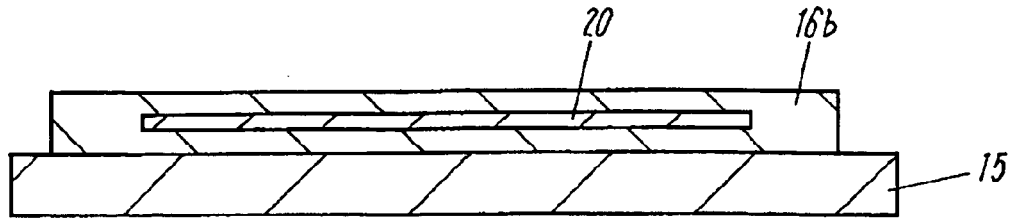
FIG. 13A is a sectional view of the load sensor for illustrating another method of manufacturing the sensor according to the embodiment.

As shown in FIG. 13A, glass paste and electrode paste are printed on substrate 15 and fired to provide glass layer 16b having internal electrode 20 embedded therein. The thickness of portion 116b of glass layer 16b between substrate 1 and internal electrode 20 ranges preferably from 10 μm to 200 μm. If the thickness is less than 10 μm, pinholes may be produced in glass layer 16b. The thickness exceeding 200 μm increases cost. Internal electrode 20 in glass layer 16b improves electromagnetic interference (EMI) characteristic, thereby preventing the load sensor from being influenced by electromagnetic waves from, for example, mobile phones and radios.

Figure 13B:
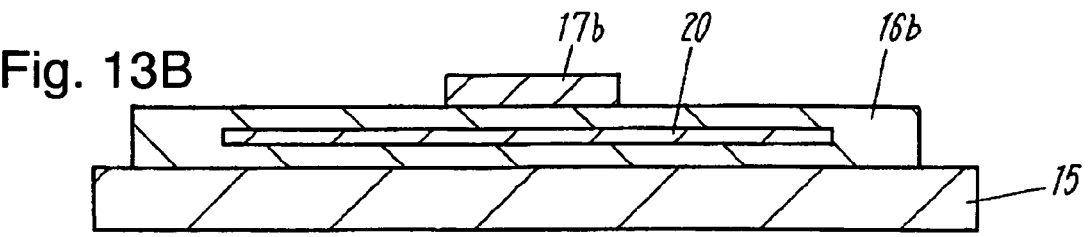
FIG. 13B is a sectional view of the load sensor for illustrating another method of manufacturing the sensor according to the embodiment.

Next, as shown in FIG. 13B, adjusting layer 17b is formed on glass layer 16b. Adjusting layer 17b is preferably larger than strain-sensitive resistor element 19b formed on adjusting layer 17b. Adjusting layer 17b can be formed by printing and firing paste of material of the layer.

Figure 13C:
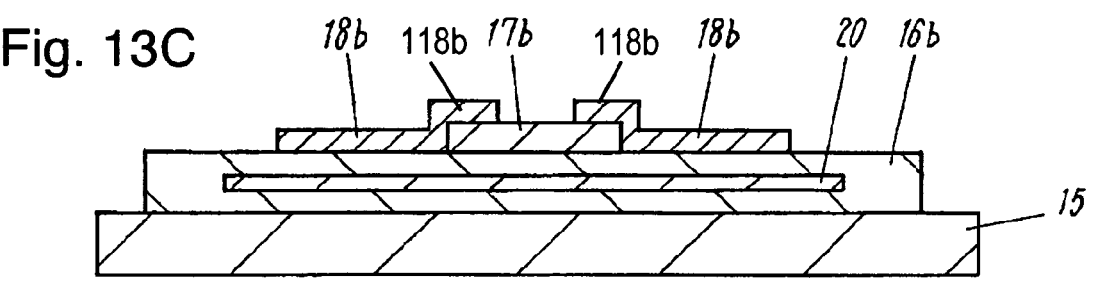
FIG. 13C is a sectional view of the load sensor for illustrating another method of manufacturing the sensor according to the embodiment.

Next, as shown in FIG. 13C, plural wirings 18b are formed. At least respective one ends 118b of the wirings is located on adjusting layer 17b. Wirings 18b can be formed by printing and firing paste of material of the wirings.

Figure 13D:
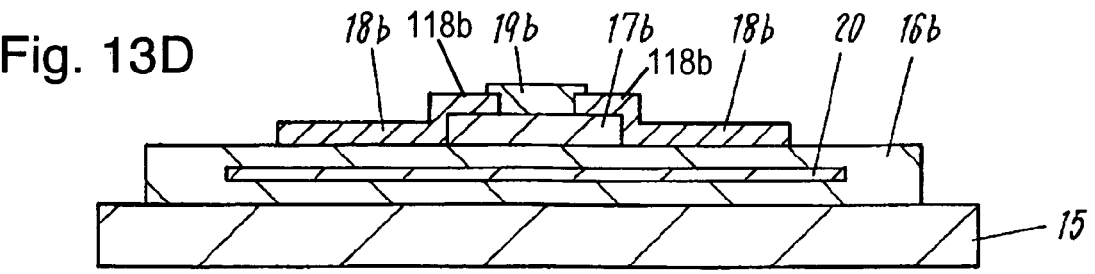
FIG. 13D is a sectional view of the load sensor for illustrating another method of manufacturing the sensor according to the embodiment.

Then, as shown in FIG. 13D, strain-sensitive resistor element 19b is formed on adjusting layer 17b and between plural wirings 18b. Resistor element 19b can be formed by printing and firing paste of material of the element.

Figure 13E:
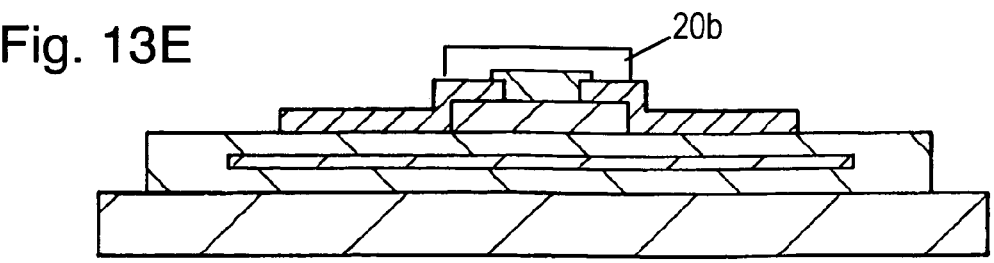
FIG. 13E is a sectional view of the load sensor for illustrating another method of manufacturing the sensor according to the embodiment.

Finally, as shown in FIG. 13E, protective layer 20b covering at least the surface of resistor element 19b is formed. The above method provides adjusting layer 17b directly beneath resistor element 19b by inexpensive method, such as printing, and allows load sensors hardly influenced by the thermal expansion coefficient of substrate 15 to be manufactured inexpensively.

In FIG. 13A, glass layer 16b may be formed by repetitively printing and drying the paste of the material to provide plural glass layers, hence reducing an influence of pinholes in glass layer 16b.

Glass layer 16b, internal electrode 20, and adjusting layer 17b can be fired simultaneously together, thus reducing production cost of load sensors. Glass layer 16b and adjusting layer 17b may have thermal expansion coefficients different from each other, but the difference during the simultaneous firing is negligible since adjusting layer 17b is printed on just a small area.

Glass layer 16b, adjusting layer 17b, internal electrode 20, and wirings 18b may be fired simultaneously together as required, thereby reducing cost. Metal generally has a contraction starting temperature lower than that of glass. Paste for forming internal electrode 20 and wirings 18b may be include contraction depressant, preventing the electrode and wirings from fractures and cracks due to the difference of the amount of contraction during the firing. The contraction depressant may employ inorganic material, such as glass powder and ceramic powder for glass layer 16b and adjusting layer 17b.

The amount of the contraction depressant to be added ranges preferably from 1 wt % to 20 wt %. The amount of the contraction depressant less than 1 wt % may not suppress the contraction effectively. The amount exceeding 20 wt % increases the resistance of wiring 18b, thus influencing characteristics of resistor element 19b.

Figure 14:
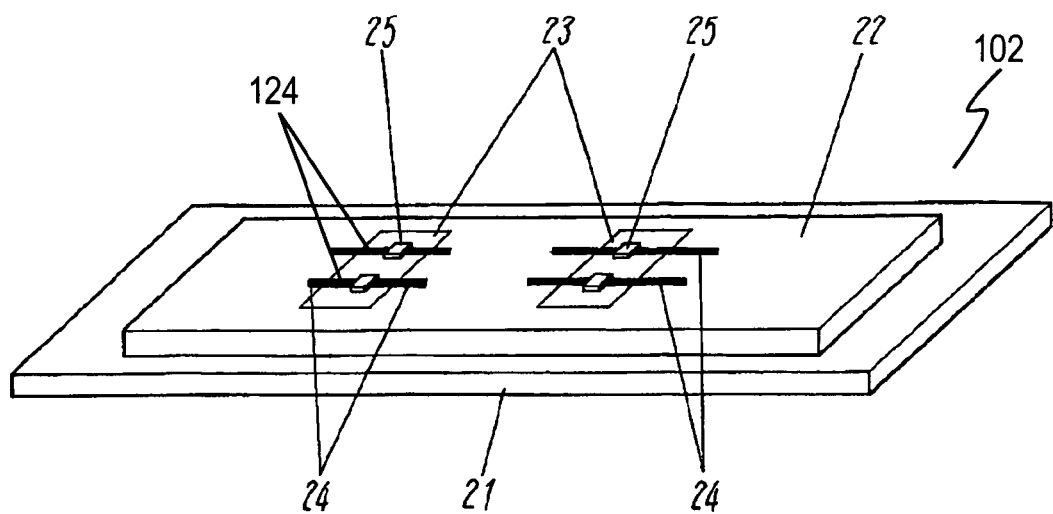
FIG. 14 is a perspective view of the load sensor according to the embodiment.

FIG. 14 is an external view of another load sensor 102 according to the embodiment. A protective layer is not illustrated for description below. A strain produced by a process applied to substrate 21, such as processes for outer edges, hole-drilling, and fitting process, may influence characteristics of strain-sensitive resistor element 25. In FIG. 14, just a part of wiring 24 is illustrated, and components and wirings connected to wiring 24 are not shown. As shown in FIG. 14, load sensor 102 includes substrate 21, glass layer 22 on substrate 21, adjusting layer 23 on glass layer 22, portions 124 of wirings 24 on adjusting layer 23, and strain-sensitive resistor element 25 on adjusting layer 23. Resistor element 25 is connected to portions 124 of wirings 24.

Load sensor 102 shown in FIG. 14 detects a load applied thereto based on a change of the resistance of plural strain-sensitive resistor elements 25. Plural resistor elements 25 preferably form a bridge circuit. In this case, if the resistances of plural resistor elements 25 are different from one another, the bridge circuit composed of resistor element 25 may not have predetermined characteristics. Plural resistor elements 25, being formed on single adjusting layer 23, enable paste of material of resistor element 25 to be printed stably, thus suppressing variation of the resistances.

The thickness of adjusting layer 23 is preferably not less than 1 μm and is less than 500 μm. If the thickness is less than 1 μm, adjusting layer 23 may not absorb the difference between the thermal expansion coefficients of glass layer 22 and resistor element 23, and may have pinholes produced therein. The thickness exceeding 500 μm increases material cost of adjusting layer 23.

The area corresponding to each resistor element 25 of adjusting layer 23 is preferably not less than 0.1 mm×0.1 mm and is less than 50 mm×50 mm. If the area is less than 0.1 mm×0.1 mm, adjusting layer 23 may have a cross section projecting and have flat portions decrease, hence preventing paste of material resistor element 25 from being applied on adjusting layer 23 accurately. Adjusting layer 23 having the area larger than 0.1 mm×0.1 mm has a lot of flat portions, hence facilitating the accurate printing of the paste of the material of resistor element 25 on adjusting layer 23. If the area exceeds 50 mm×50 mm, cracks may be produced due to the difference between the thermal expansion coefficients of adjusting layer 23 and glass layer 22 under layer 23. The area of adjusting layer 23 is preferably larger than that of resistor element 25. If the area of adjusting layer 23 is smaller than that of resistor element 25, resistor element 25 may contact glass layer 22, and this may affect distribution of stress in resistor element 25. Plural resistor elements 25 provided on single adjusting layer 23 allows resistor element 25 to be printed stably.

Figure 15:
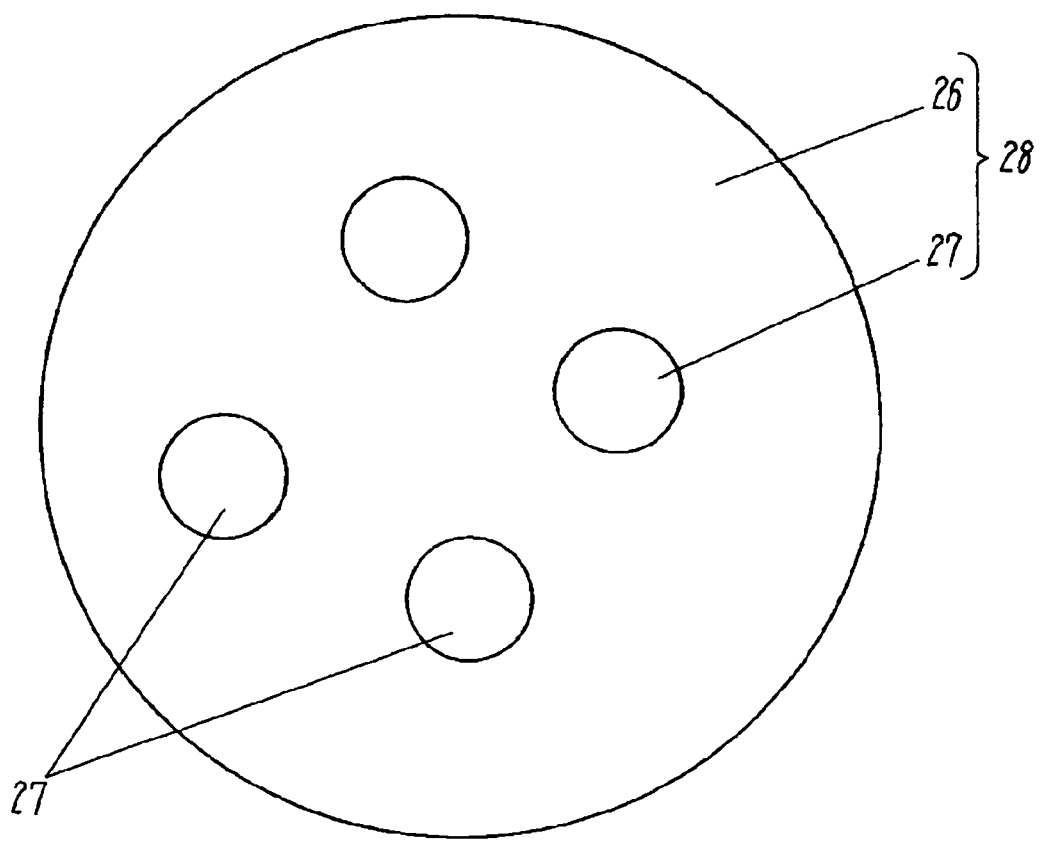
FIG. 15 is an enlarged schematic view of composite glass used for an adjusting layer.

FIG. 15 is an enlarged schematic view of the composite glass used for adjusting layer 3 according to the embodiment. As shown in FIG. 15, crystallized glass 26 and ceramic powder 27 dispersed in glass 26 are fired simultaneously to glass 26 to provide composite glass 28. The simultaneous firing of crystallized glass 26 and ceramic powder 27 dispersed in glass 26 allows the kind and the amount of ceramic powder 27 added into composite glass 26 to be adjusted precisely so as to adjust its thermal expansion coefficient precisely.

For example, in the case that the thermal expansion coefficient of glass 26 shown in FIG. 15 is 8.5 ppm/° C., ceramic powder (filler) 27 made of alumina having a thermal expansion coefficient of 7 ppm/° C. may be added to glass 26 as to decrease a thermal expansion coefficient of composite glass 28. Further, zirconia having a thermal expansion coefficient of 9.5 ppm/° C. as ceramic powder 27 increases the thermal expansion coefficient of composite glass 28. Glass 26 having a large thermal expansion coefficient, such as 10 ppm/° C. or 13 ppm/° C., may provide the composite glass similarly, thus absorbing the difference between the thermal expansion coefficients of resistor element 5 and substrate 1.

The concentration of the filler added to glass 26 is preferably not less than 5 wt % and is less than 40 wt %. The concentration of the filler less than 5 wt % may not be effective. The concentration of the filler exceeding 40 wt % may prevent composite glass 28 from being sintered, thus decreasing strength of the glass since the amount of glass 26 may be too small to cover the surface of ceramic powder 27.

Ceramic powder 27 to be added to composite glass 28 in adjusting layer 3 may preferably employ alumina ($Al_2O_3$ having a thermal expansion coefficient: ranging from 6.5 ppm/° C. to 8.0 ppm/° C.), MgO (having a thermal expansion coefficient of 13 ppm/° C.), forsterite ($MgO.SiO_2$ having a thermal expansion coefficient: ranging from 8 ppm/° C. to 11 ppm/° C. depending on its composition), zirconia (having a thermal expansion coefficient of 10.4 ppm/° C.), titanium oxide, calcium oxide, magnesium oxide, or spinel ($MgO.Al_2O_3$). An average particle diameter of the ceramic powder ranges preferably from about 0.01 μm to 5 μm. The average particle diameter smaller than 0.01 μm increases cost. The diameter exceeding 5 μm may prevents the simultaneous firing together with glass 26. Commercially-available crystallized glass other than that of the embodiment may include ceramic powder 27 as the filler, hence providing composite glass 28 having a thermal expansion coefficient which can be adjusted precisely as to design adjusting layer 3 appropriately.

Ceramic powder 27 preferably has a thermal expansion coefficient which is not smaller than 6 ppm/° C. and is smaller than 15 ppm/° C. Ceramic powder 27 having a thermal expansion coefficient which is smaller than 6 ppm/° C. or is not smaller than 15 ppm/° C. may make the composite glass ineffective.

In particular, ceramic powder 27 in composite glass 28 hardly reacts with glass 26, and thus often remains unchanged after being fired, as shown in FIG. 15. Therefore, the thermal expansion coefficient of composite glass 28 can be easily derived from a proportional calculation of the thermal expansion coefficients of crystallized glass and ceramic powder 27 to be added.

Glass 26 and ceramic powder 27 diffusing in the glass are observed by analysis of a cross section of actual composite glass 28 with a scanning electron microscope (SEM) or X-ray microanalysis (XMA). According to element-analysis of them, plural elements composing glass 26, such as MgO, $SiO_2$, and $Al_2O_3$, are found uniformly mixed. In ceramic powder 27 including alumina as its main element, a large amount of aluminum and oxygen are specifically detected. In ceramic powder including zirconia oxide, a large amount of zirconia and oxygen are specifically detected. This detection facilitates distinguishing whether these elements are included in glass 26 or added as the filler to compose composite glass 28.

Figure 16:
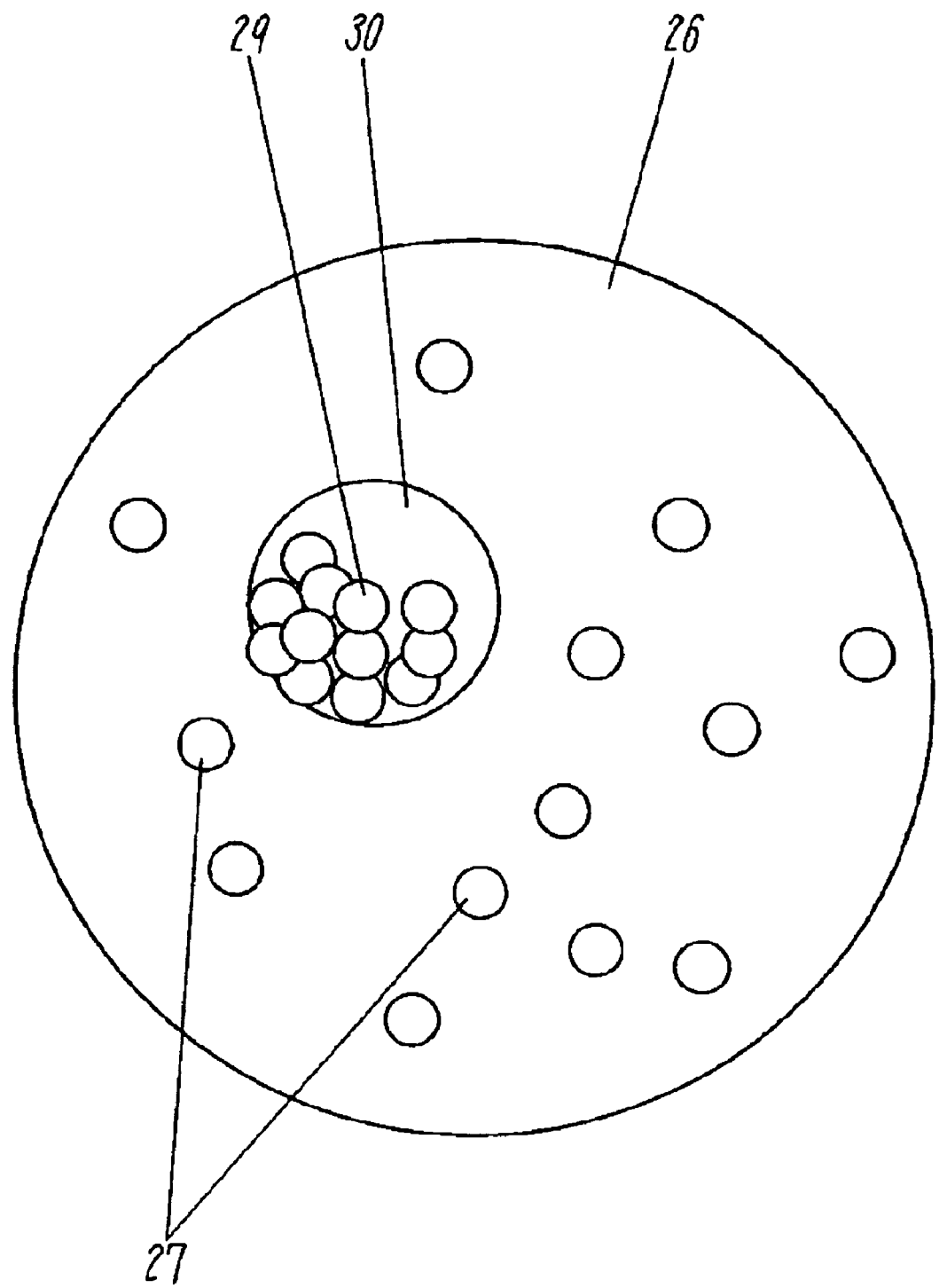
FIG. 16 illustrates pinholes produced in the composite glass.
Figure 17A:
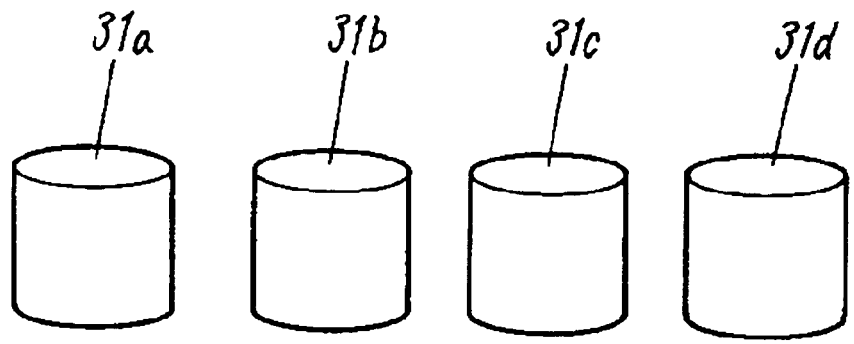
FIG. 17A schematically illustrates a method of manufacturing the composite glass paste used for the adjusting layer of the load sensor according to the embodiment.
Figure 17B:
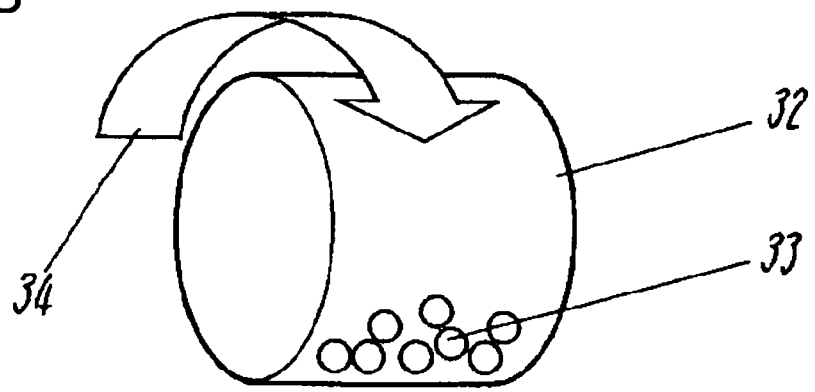
FIG. 17B schematically illustrates a method of manufacturing the composite glass paste used for the adjusting layer of the load sensor according to the embodiment.
Figure 17C:
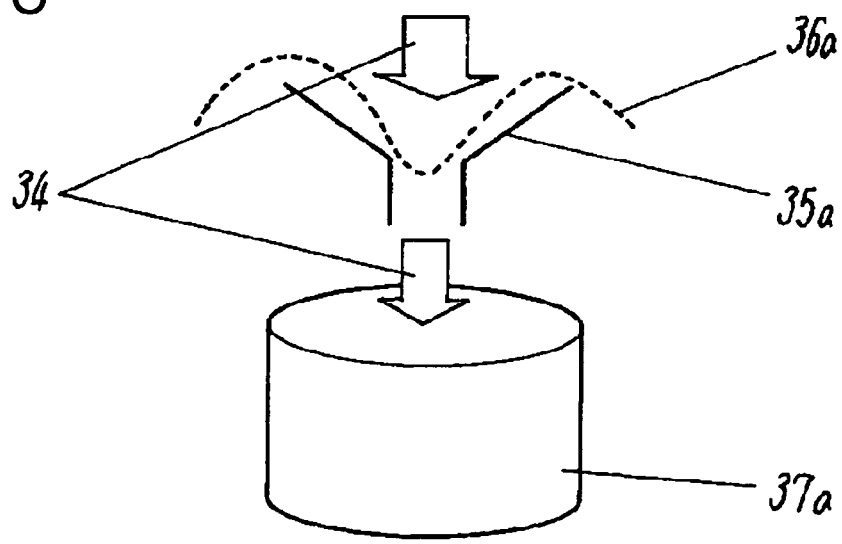
FIG. 17C schematically illustrates a method of manufacturing the composite glass paste used for the adjusting layer of the load sensor according to the embodiment.

A method of manufacturing glass paste for adjusting layer 3 according to the embodiment will be described below. FIG. 16 is an explanatory diagram of pinholes which may be produced in the composite glass. FIGS. 17A to 17C are schematic diagrams for illustrating a method of manufacturing the paste for the composite glass for adjusting layer 3 according to the embodiment. FIGS. 18A to 18D are schematic diagrams for illustrating a method of manufacturing the paste of the composite glass for adjusting layer 3 according to the embodiment.

As shown in FIG. 16, composite glass 26 may include ceramic-powder aggregate 29 and pinhole 30. If ceramic powder 27 is uniformly dispersed in glass 26, pinhole 30 are not produced. However, if ceramic powder aggregate 29 is produced due to inadequate dispersion of ceramic powder 27, pinhole 30 may be produced, as shown in FIG. 16. This is caused by ceramic powder 27 which is not sintered at a temperature for firing glass 26. Ceramic powder 27 forming ceramic powder aggregate 29 may possibly produces pinhole 30 in composite glass 26. The ceramic powder dispersed uniformly in composite glass 26 prevents pinhole 30.

The method of manufacturing the paste for the composite glass will be described with referring to FIGS. 17A to 17C and FIGS. 18A to 18D. According to the embodiment, ceramic powder 27 for composite glass 26 is previously dispersed in solvent, and glass powder is mixed with the solvent and kneaded. As above, glass powder and ceramic powder 27 are individually dispersed under their appropriate conditions, thereby providing paste of the composite glass excluding ceramic powder aggregate 29.

As shown in FIG. 17A, predetermined materials 31a to 31d, such as the ceramic powder, the solvent, dispersant, and a small amount of resin, are prepared. The resin, being to be added, improves wettability of the ceramic powder to glass. However, an excessive amount of the resin increases the viscosity and prevents the dispersion, and therefore, the resin to be added is limited to the small amount.

Materials 31a to 31d are dispersed by bead 33 in dispersing apparatus 32, as shown in FIG. 17B, thus providing slurry. Dispersing apparatus 32 may be preferably an agitating, oscillating, or rotating dispersing apparatus with bead 33, such as a rotating ball mill, agitating ball mill, and DYNO-MILL made by Shinmaru Enterprises Corporation. Above-mentioned dispersing apparatus 32 can disperse the ceramic powder dispersed in solvent and a small amount of the dispersant without producing the ceramic powder aggregate.

For this dispersion, the viscosity of the slurry made of the ceramic powder, the solvent, the dispersant, and the small amount of the resin is preferably not smaller than 1 centipoise (cP) and is not larger than 10 poises (P). The viscosity smaller than 1 cP may cause the ceramic powder to be deposited when the slurry is extracted and filtrated even if the ceramic powder is uniformly mixed in dispersing device 32. The viscosity exceeding 10 P may prevent dispersing apparatus 32 with bead 33 from adequately disperse the ceramic powder, and prevent bead 33 and the slurry from being removed from each other.

The diameter of bead 33 is preferably not larger than 10 cm. If being small, bead 33 disperses even fine-grained ceramic powder, and, however, having small collision energy among bead 33, hence requiring dispersing apparatus 32 having certain power. Dispersing apparatus 32, such as rotating dispersing apparatus 32, may not use bead 33 smaller than 0.3 mmΦ depending on the performance of a lip seal (a seal mechanism in dispersing apparatus 32).

Material for bead 33 may be preferably commercially-available alumina, or zirconia including yttria. Bead 33 may be made of material identical to that of the ceramic power, hence preventing the material from being impurity even if bead 33 is ground and mixed in the slurry.

The slurry is poured into filter 36a provided in filtering apparatus 35a to be filtrated and is collected in container 37a, as shown in arrows 34.

Filter 36a may employ a commercially-available net having openings ranging from 10 μm to 20 μm, and employ a depth filter (volume filtration type) formed by spooling fiber. This fiber allows filter 36a to filtrate a large amount of slurry with a low pressure loss, that is, under the situation that filter 36a hardly clogs. The slurry may be filtrated by its own weight, and may be filtrated by an air pressure or a diaphragm pump, which improves working efficiency.

Figure 18A:
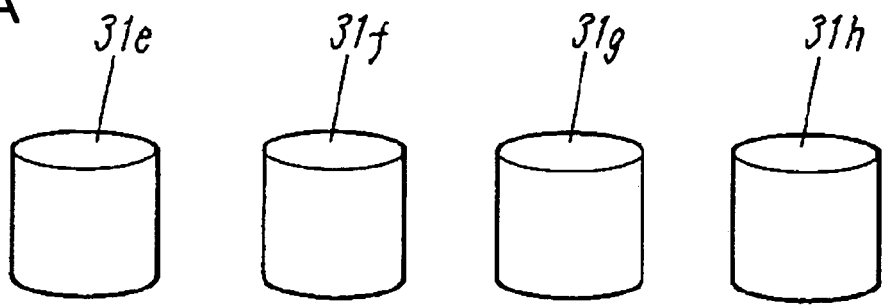
FIG. 18A schematically illustrates a method of manufacturing the composite glass paste used for the adjusting layer of the load sensor according to the embodiment.

Then, as shown in FIG. 18A, predetermined materials 31e to 31h, such as the slurry including the ceramic powder dispersed therein and collected in container 37, glass powder, resin, dispersant, are prepared. Coloring agent may be added according to requirement as to facilitating to distinguish thicknesses and conditions of layers, thus facilitating production control and product management.

Figure 18B:
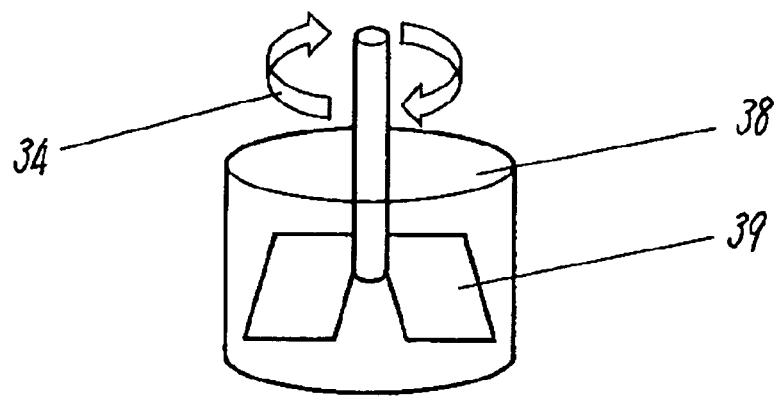
FIG. 18B schematically illustrates a method of manufacturing the composite glass paste used for the adjusting layer of the load sensor according to the embodiment.

Kneading apparatus 38 shown in FIG. 18B includes agitating member 39 therein. Kneading apparatus 38 may employ a planetary mixer, a kneader, or an automatic mortar. Agitating member 39 provided in kneading apparatus 38 can stably knead material even having a large viscosity. In the load sensor according to the embodiment, the paste for for the composite glass is screen-printed as to reduce cost. In this screen-printing, paste of the composite glass having an excessively small viscosity may cause a printed pattern to blur or cause an inadequate thickness, thus requiring the viscosity larger than a predetermined value. The composite glass may have a viscosity larger than several tens of thousands of poises and may not flow at all by its own weight. In this case, kneading apparatus 38 including agitating member 39 is preferably used to knead paste of the glass.

As shown in FIG. 18B, predetermined amounts of materials 31e to 31h are input into kneading apparatus 38 and kneaded with agitating member 39 rotating them in a direction of arrows 34. Materials 31e to 31h are input preferably in an order preventing the materials from reacting with each other. For example, when large amounts of the glass powder and resin are mixed and kneaded at once, or when large amounts of the slurry and the glass powder are mixed and kneaded at once, the ceramic powder aggregate may be produced. In order to prevent such occurrence of ceramic powder aggregates, which is called solvent shock, the materials are input in fractional amounts, or combinations of the materials which prevents the aggregation are previously determined.

Figure 18C:
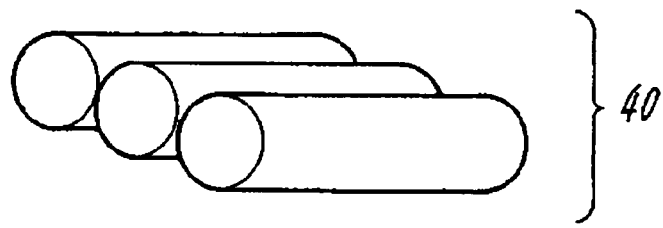
FIG. 18C schematically illustrates a method of manufacturing the composite glass paste used for the adjusting layer of the load sensor according to the embodiment.

Then, as shown in FIG. 18C, kneading apparatus 38, such as three rolls 40, mixes and kneads the ceramic powder and the glass powder in the slurry uniformly disperse, thus providing paste of the composite glass.

Figure 18D:
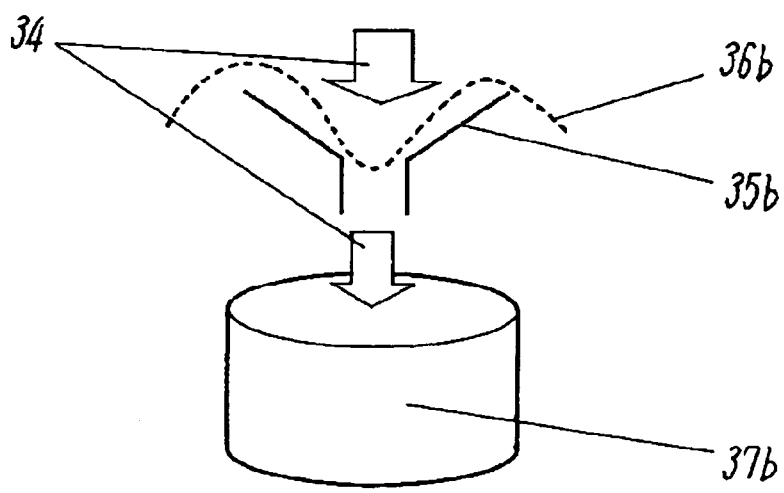
FIG. 18D schematically illustrates a method of manufacturing the composite glass paste used for the adjusting layer of the load sensor according to the embodiment.

Finally, as shown in FIG. 18D, the paste is filtrated with filtering apparatus 35b including filter 36b to remove unnecessary substances and aggregates from the glass paste used for adjusting layer 3.

The paste of the composite glass will be described in detail below.

The ceramic powder for material 31a shown in FIG. 17A employed commercially-available and inexpensive (several dollars/kg) alumina powder having a particle diameter of 0.4 μm and including a large number of ceramic powder aggregates.

Next, such small amount of the solvent slightly exceeding an oil-absorbing amount (the oil-absorbing amount is described in JIS-K5101 in detail), solvent (e.g. butyl carbitol acetate), and dispersant were added to the alumina powder to produce alumina slurry having a high density and a small viscosity. The powder was then dispersed for a predetermined time with a commercially-available bead mill. Bead 33 was made of alumina and had a diameter of 2 mm. According to measurement by a grind meter (described in JIS-K5600 in detail), the alumina slurry did not include ceramic powder aggregates having diameters larger than 3 μm. According to measurement by a particle-size analyzer, the alumina slurry was dissolved to primary particles in its particle-size distribution. The alumina was included at a high density, greater than 60 wt %, preferably greater than 80 wt %, while a predetermined amount of the dispersant was added in this alumina slurry. Although having a viscosity less than 10 P (a slithering speed ranging from 1/s to 100/s), the slurry exhibited stable dispersion even after 24 hours from agitation. In order to store this alumina slurry for a long time, the slurry may rotate on a rotating pedestal as to prevent precipitation and re-aggregation of the ceramic powder. The alumina slurry, as shown in FIG. 17C, was filtrated with filter 36a having openings of 10 μm.

Next, as shown in FIG. 18A, this alumina slurry, glass powder, and other binder were weighed, mixed as shown in FIG. 18B, and finally roll-kneaded, as shown in FIG. 18C. Composite glass paste produced as above was filtrated with filter 36b having openings of 20 μm. The filtrated composite glass paste provided adjusting layer 3 to manufacture load sensor 101 shown in FIG. 1. According to observation of the cross section of adjusting layer 3 by the SEM or the XMA, alumina dispersed uniformly in glass 26, as shown in FIG. 15, was confirmed.

In order to disperse the material to avoid the ceramic powder aggregates, a lot of processes are required, and thus efficiently dispersing it inexpensively is demanded. Ceramic slurry of a high concentration increases dispersion efficiency and decreases production cost. In particular, it is important that ceramic slurry having a high concentration (e.g. an amount of solvent more than 10% to 50% surplus over the oil-absorbing amount of the slurry) is dispersed. If the amount of the solvent is less than the oil-absorbing amount of the slurry, the ceramic slurry is hardly dispersed with beads due to its excessively-large viscosity. If the amount of solvent is more than the oil-absorbing amount of the slurry by 100% (for example, 100 g of solvent for 50 g of oil-absorbing amount measured according to JIS), the viscosity of the ceramic slurry is adequately small, and however, the excessive amount of the solvent may need to be decreased.

Next, elastic metal used as substrate 1 of load sensor 101 will be described.

In load sensor 101 according to the embodiment, adjusting layer 3 allows substrate 1 made of inexpensive metallic material to be used. Heat-resistant steel made of ferritic alloy is more suitable to material of substrate 1 than steel made of age-hardened alloy, such as ustenitic alloy and nickel-base alloy, or cobalt-base alloy, such as Inconel. The ferrite based heat resistant steel allows the sensor to be easily processed accurately, and reduces an amount of residual stress and process distortion after processing. The elastic metal may include aluminum according to requirement, and the aluminum added during heat treatment provides a membrane of aluminum oxide on the elastic metal, hence increasing heat resistance and oxidation resistance of substrate 1. Material of this metal may employ AISII-type 300-series and 400-series alloy, such as SUS304, SUS316, SUS404, SUS430, S17, and S444. However, other elastic metal may be used after a surface of the metal is processed to have heat resistance. Such alloy has a thermal expansion coefficient ranging from $90 \times 10^{-7}/°$ C. to $140 \times 10^{-7}/°$ C. changing depending on its composition.

The elastic metal is processed to have a predetermined shape for load sensor 101, and then, have distortion remaining in substrate 1. Therefore, upon having a glass paste printed thereon and fired, substrate often deforms by an amount exceeding its own thermal expansion coefficient. For example, substrate 1 may largely warped by an amount exceeding a warping amount calculated from the difference between the thermal expansion coefficients of glass and metal. Even if made of a single kind of SUS material, substrates 1 having respective thicknesses of 0.5 mm, 2 mm, and 5 mm are warped by amounts different from each other when substrates 1 are processed to have a predetermined shape by press working (die-cutting). Since a processing method changes according to the thickness, a warpage amount of the metal changes according to pressure, method, procedure, mold during processing of the metal.

Such warpage can be corrected after processing, but even this correction can hardly cancel residual stress and deformation amount during heat-treating. Therefore, adjusting layer 3 provides the lord sensor including substrate 1 processed to have the predetermined shape and having stress remaining inside.

The paste of the material of resistor element 5 is fired at a temperature which is preferably not lower than 400° C. and is lower than 1,000° C. The temperature lower than 400° C. may cause the paste to be sintered inadequately, thus not providing resistor element 5 with a predetermined strength. The firing temperature exceeding 1,000° C. may oxidize substrate 1 and decrease its bearing force, hence requiring expensive and specific metal material for substrate 1.

Glass layer 2 made of crystallized glass has a bearing force and breaking strength more than that made of noncrystalline glass. An internal electrode including one or more layers may be formed in glass layer 2, and wiring 4 is connected to the internal electrode via a connecting member, such as a through hole, thereby increases noise immunity of the sensor The glass paste for adjusting layer 3 including glass powder as main component, resin, solvent, and 5 wt % to 40 wt % of ceramic powder has a thermal expansion coefficient after firing adjusted reproducibly, and providing adjusting layer 3 inexpensively. Adjusting layer 3 is fired preferably at a temperature ranging from 400° C. to 900° C. If being fired at a temperature lower than 400° C., adjusting layer 3 may be sintered inadequately, and thus, may not have a predetermined strength. If being fired at a temperature exceeding 1,000° C., metal substrate 1 tends to be oxidized and has its bearing force decrease. This case requires expensive and specific metal material for substrate 1

INDUSTRIAL APPLICABILITY

A load sensor according to the present invention can employ general-purpose material for a strain-sensitive resistor element even for substrates having various thermal expansion coefficients, hence being effective for multi-product and cost reduction.

The invention claimed is:

1. A method of manufacturing a load sensor, comprising:
   forming a glass layer on a substrate made of metal;
   providing glass paste;
   forming an adjusting layer by applying the glass paste onto the glass layer and firing the applied glass paste;
   forming a plurality of wirings on the adjusting layer; and
   forming a strain-sensitive resistor element connected among the plurality of wirings by applying resistor element paste onto the adjusting layer and firing the resistor element paste, wherein a thermal expansion coefficient of the adjusting layer is closer to a thermal expansion coefficient of the strain-sensitive resistor element than to a thermal expansion coefficient of the glass layer,
   wherein said providing the glass paste comprises:
       dispersing ceramic powder in solvent and binder as to have a viscosity which is not smaller than 0.01 poises and is smaller than 100 poises, and
       dispersing glass powder in the solvent and the binder including the ceramic powder dispersed therein to have a viscosity which is not smaller than 100 poises and is smaller than 10,000 poises.

2. The method as defined in claim 1, further comprising forming a protective layer covering the strain-sensitive resistor element and respective portions of the plurality of wirings.

3. The method as defined in claim 1, wherein the substrate has a thickness not smaller than 1 mm.

4. The method as defined in claim 1, wherein said forming the strain-sensitive resistor element comprises firing the applied resistor element paste at a temperature which is not lower than 400° C. and is lower than 1,000° C.

5. The method as defined in claim 1, wherein said forming an adjusting layer comprises firing the applied glass paste at a temperature ranging from 400° C. to 900° C.

6. The method as defined in claim 1, wherein the glass paste includes 5 wt % to 40 wt % of ceramic powder dispersed therein.

7. The method as defined in claim 1, wherein said forming the glass layer comprises forming a glass layer including an electrode therein.

8. A method of manufacturing a load sensor, comprising:

forming a glass layer on a substrate made of metal;

providing glass paste;

forming an adjusting layer by applying the glass paste onto the glass layer and firing the applied glass paste;

forming a plurality of wirings on the adjusting layer; and forming a strain-sensitive resistor element connected among the plurality of wirings by applying resistor element paste onto the adjusting layer and firing the resistor element paste, wherein a thermal expansion coefficient of the adjusting layer is closer to a thermal expansion coefficient of the strain-sensitive resistor element than to a thermal expansion coefficient of the glass layer, wherein said providing the glass paste comprises:

dispersing ceramic powder in solvent and dispersant as to have a viscosity which is not smaller than 0.01 poises and is smaller than 100 poises; and dispersing glass powder in the solvent and the dispersant including the ceramic powder dispersed therein as to have a viscosity which is not smaller than 100 poises and is smaller than 10,000 poises.

9. The method as defined in claim 8, further comprising:

forming a protective layer covering the strain-sensitive resistor element and respective portions of the plurality of wirings.

10. The method as defined in claim 8, wherein the substrate has a thickness not smaller than 1 mm.

11. The method as defined in claim 8, wherein said forming the strain-sensitive resistor element comprises firing the applied resistor element paste at a temperature which is not lower than 400° C. and is lower than 1,000° C.

12. The method as defined in claim 8, wherein said forming an adjusting layer comprises firing the applied glass paste at a temperature ranging from 400° C. to 900° C.

13. The method as defined in claim 8, wherein the glass paste includes 5 wt % to 40 wt % of ceramic powder dispersed therein.

14. The method as defined in claim 8, wherein said forming the glass layer comprises forming a glass layer including an electrode therein.

* * * * *